US012747181B2

(12) United States Patent
Beall et al.

(10) Patent No.: US 12,747,181 B2
(45) Date of Patent: Sep. 29, 2026

(54) THERMALLY TEMPERED GLASS-CERAMICS

(71) Applicant: CORNING INCORPORATED, Corning, NY (US)

(72) Inventors: George Halsey Beall, Big Flats, NY (US); Marie Jacqueline Monique Comte, Fontenay aux Roses (FR); Charlene Marie Smith, Corning, NY (US); Steven Alvin Tietje, Lindley, NY (US)

(73) Assignee: CORNING INCORPORATED, Corning, NY (US)

( * ) Notice: Subject to any disclaimer, the term of this patent is extended or adjusted under 35 U.S.C. 154(b) by 915 days.

(21) Appl. No.: 17/908,946

(22) PCT Filed: Feb. 19, 2021

(86) PCT No.: PCT/US2021/018645
§ 371 (c)(1),
(2) Date: Sep. 2, 2022

(87) PCT Pub. No.: WO2021/178144
PCT Pub. Date: Sep. 10, 2021

(65) Prior Publication Data

US 2023/0087123 A1 Mar. 23, 2023

Related U.S. Application Data

(60) Provisional application No. 62/986,069, filed on Mar. 6, 2020.

(51) Int. Cl.
*B32B 15/04* (2006.01)
*B32B 17/06* (2006.01)
(Continued)

(52) U.S. Cl.
CPC .......... *C03B 27/024* (2013.01); *C03B 27/026* (2013.01); *C03B 27/028* (2013.01);
(Continued)

(58) Field of Classification Search
CPC .................................................... C03C 21/002
(Continued)

(56) References Cited

U.S. PATENT DOCUMENTS 3,637,453 A * 1/1972 Simmons .............. C03C 21/002 428/428
3,849,097 A * 11/1974 Giffen ..................... C03C 17/02 65/121

(Continued)

FOREIGN PATENT DOCUMENTS

EP 0428002 A1 5/1991

OTHER PUBLICATIONS

International Search Report and Written Opinion of the International Searching Authority; PCT/US21/18645; Mailed Jun. 4, 2021; 11 Pages; European Patent Office.

*Primary Examiner* — Lauren R Colgan
(74) *Attorney, Agent, or Firm* — Svetlana Z. Short

(57) ABSTRACT

A thermally tempered aluminosilicate glass-ceramic composition includes a crystalline phase and a residual glass phase, wherein the two phases form a system wherein the thermal expansion curve of the system has two distinct sections diverging from an inflection point temperature in the range of about 450° C. to about 600° C., and wherein the difference between coefficient of thermal expansion of the glass-ceramic below and above the inflection point is greater than about 4 ppm/° C.

14 Claims, 8 Drawing Sheets

1A

1B

(51) Int. Cl.

| | |
|---|---|
| ***C03B 27/02*** | (2006.01) |
| ***C03C 3/085*** | (2006.01) |
| ***C03C 3/112*** | (2006.01) |
| ***C03C 10/00*** | (2006.01) |
| ***C03C 10/16*** | (2006.01) |

(52) U.S. Cl.
CPC .............. *C03C 3/085* (2013.01); *C03C 3/112* (2013.01); *C03C 10/0045* (2013.01); *C03C 10/0054* (2013.01); *C03C 10/16* (2013.01)

(58) Field of Classification Search
USPC .................................................. 428/410, 426
See application file for complete search history.

(56) References Cited

U.S. PATENT DOCUMENTS

| | | | | |
|---|---|---|---|---|
| 3,931,438 | A * | 1/1976 | Beall | C03C 10/00 428/218 |
| 3,985,533 | A * | 10/1976 | Grossman | C03C 10/0027 501/7 |
| 4,042,362 | A | 8/1977 | Macdowell et al. | |
| 4,244,723 | A * | 1/1981 | Grossman | C03C 10/0045 65/114 |
| 4,391,914 | A * | 7/1983 | Beall | C03C 10/0027 501/67 |
| 4,394,914 | A | 7/1983 | Privat | |
| 4,940,674 | A * | 7/1990 | Beall | C03C 10/0054 501/67 |
| 6,952,530 | B2 | 10/2005 | Helvajian et al. | |
| 9,296,638 | B2 * | 3/2016 | Lezzi | C03B 27/0404 |
| 9,701,574 | B2 * | 7/2017 | Beunet | C03C 10/0027 |
| 9,751,798 | B2 * | 9/2017 | Beall | C03C 3/097 |
| 9,790,124 | B2 * | 10/2017 | Dejneka | C03C 4/005 |
| 11,097,974 | B2 * | 8/2021 | Lezzi | B32B 17/10036 |
| 11,518,707 | B2 * | 12/2022 | Beall | C03C 10/16 |
| 11,643,355 | B2 * | 5/2023 | Finkeldey | B32B 17/10091 428/220 |
| 11,708,296 | B2 * | 7/2023 | Gross | C03B 27/044 501/63 |
| 2008/0268295 | A1 * | 10/2008 | Yagi | G11B 5/73921 501/63 |
| 2009/0118113 | A1 * | 5/2009 | Yagi | G11B 5/73913 501/63 |
| 2016/0280589 | A1 * | 9/2016 | Beall | C03C 10/0054 |
| 2018/0155235 | A1 * | 6/2018 | Beall | C03C 10/0045 |
| 2019/0002328 | A1 * | 1/2019 | Lezzi | C03B 27/044 |
| 2019/0002329 | A1 * | 1/2019 | Maschmeyer | C03B 29/12 |
| 2019/0002331 | A1 * | 1/2019 | Lezzi | C03B 27/016 |
| 2023/0087123 | A1 * | 3/2023 | Beall | C03B 27/028 65/114 |

* cited by examiner

1A

1B

THERMALLY TEMPERED GLASS-CERAMICS

CROSS-REFERENCE TO RELATED PATENT APPLICATIONS

This application claims the benefit of priority under 35 U.S.C. § 371 of International Application No. PCT/US2021/018645, filed on Feb. 19, 2021, which claims the benefit of priority under 35 U.S.C. § 119 if U.S. Provisional Application No. 62/986,069, filed Mar. 6, 2020, the content of which is incorporated herein by reference in its entirety.

The disclosure relates to thermally tempered glass-ceramics. In particular, the disclosure relates to glass-ceramics and precursor glasses that are crystallizable to glass-ceramics, which may be strengthened by thermal tempering process, methods for making the thermally tempered glass-ceramics and articles and devices that include the thermally tempered glass-ceramics.

BACKGROUND

The following discussion is provided to aid the reader in understanding the disclosure and is not admitted to describe or constitute prior art thereto.

Various processes may be used to strengthen glass and glass-ceramic (GC) articles, including chemical strengthening, thermal tempering, and lamination. Lamination strengthening is used to strengthen dinnerware, for example, that enables the dinnerware to withstand repeated damage from handling and cutlery. Chemical strengthening by methods such as ion-exchange is used, for example, to strengthen cover glass for displays and touch screens in electronic devices such as smart phones, tablet computers and televisions. Thermally tempered glass delivers superior mechanical performance in many applications, such as architectural windows and automobile glazing.

In the case of glass-ceramics, the residual glass in glass-ceramics is often underappreciated given what it is capable of bringing to the material. For example, the residual glass can also be designed to improve indentation response, through the addition of higher boron oxide that is partitioned into the residual glass. In several glass-ceramic systems, it is the residual glass that undergoes ion exchange leading to chemical strengthening. Thermal tempering of glass-ceramics can offer advantages over installing stress by ion exchange in terms of processing time and the resulting stress profile. Whereas ion exchange can take hours, thermal tempering times, by the very nature of thermal tempering, is on the time scale of minutes. Therefore, there is a strong need to explore new glass-ceramic compositions which can be thermally tempered to enhance their mechanical properties.

SUMMARY OF THE INVENTION

According to a first aspect, a thermally tempered aluminosilicate glass-ceramic composition comprises a crystalline phase and a residual glass phase, wherein the two phases form a system wherein the thermal expansion curve of the system has two distinct sections diverging from an inflection point temperature in the range of about 450° C. to about 600° C. In certain embodiments, the difference between coefficient of thermal expansion of the glass-ceramic below and above the inflection point is greater than about 4 ppm/° C. In certain embodiments, the difference between coefficient of thermal expansion of the glass-ceramic above and below the inflection point is in the range of about 4 ppm/° C. to about 10 ppm/° C.

In certain embodiments, coefficient of thermal expansion of the glass-ceramic below the inflection point ranges from 1 ppm/° C. to 10 ppm/° C. In certain embodiments, the coefficient of thermal expansion of the glass-ceramic above the inflection point ranges from 6 ppm/° C. to 20 ppm/° C. In certain embodiments, the thermally tempered aluminosilicate glass-ceramic composition has a Young's modulus of 70 GPa to 110 GPa. In certain embodiments, the crystalline phase of the composition comprises a main or predominant crystalline phase selected from the group consisting of mullite, fluorphlogopite and beta-spodumene solid solutions.

In certain embodiments, the precursor glass of the thermally aluminosilicate tempered glass-ceramic composition comprises, expressed in terms of mole percent on the oxide basis, from about 65% to about 75% $SiO_2$; from about 8% to about 13% $Al_2O_3$; from about 3% to about 13% $Li_2O$; from about 0.02% to about 5% $B_2O_3$; from about 0.5% to about 2% $K_2O$; from about 0% to about 2% BaO; and from about 2% to about 6% $RO_2$, wherein $RO_2$ consists of about 1% to about 4% $TiO_2$, about 0% to about 2% $ZrO_2$ and about 0% to about 1% $SnO_2$.

In certain embodiments, the precursor glass of the thermally tempered aluminosilicate glass-ceramic composition comprises, expressed in terms of mole percent on the oxide basis, from about 55% to about 65% $SiO_2$; from about 13% to about 19% $Al_2O_3$; from about 0% to about 4% $Li_2O$; from about 12% to about 17% $B_2O_3$; from about 1% to about 4% $K_2O$; and from about 2% to about 8% MgO.

In certain embodiments, the precursor glass of the thermally tempered aluminosilicate glass-ceramic composition comprises, expressed in terms of weight percent on the oxide basis, from about 40% to about 55% $SiO_2$; from about 12% to about 20% $Al_2O_3$; from about 10% to about 18% MgO; from about 4% to about 8% F; from about 5% to about 10% $B_2O_3$; from about 0% to about 2% BaO; from about 0% to about 2% $ZrO_2$; and from about 0% to about 16% $R_2O$, wherein $R_2O$ consists of about 5% to about 13% $K_2O$, about 0% to about 2% $Li_2O$, and about 0% to about 2% $Na_2O$.

According to a second aspect, a method for thermally tempering a glass-ceramic composition comprising a crystalline phase and a residual glass phase comprises heating the glass-ceramic composition to a temperature between an annealing point and a softening point of the residual glass phase to produce a heated glass-ceramic composition; and rapidly cooling the heated glass-ceramic composition to a temperature between about 250° C. to about −40° C. by contacting it with a quenching medium to provide a thermally tempered glass-ceramic.

In certain embodiments, the heated glass-ceramic composition is cooled to generate a temperature difference of at least about 200° C. between the outer surface of the glass-ceramic composition and the center of the glass composition. In certain embodiments, the quenching medium is selected from a group consisting of a vegetable oil, water, glycols, and liquid nitrogen, or a combination thereof. In certain embodiments, the quenching medium is a vegetable oil selected from the group consisting of peanut oil, high oleic sunflower oil, canola oil, soybean oil, corn oil, olive oil, sunflower oil, safflower oil, cottonseed oil, and combinations thereof. In certain embodiments, the quenching medium is maintained at a temperature of about 10° C. to about 50° C. prior to contacting it with the heated glass-ceramic. In certain embodiments, the glass composition is heated to a temperature of about 750° C. to about 950° C. for a time ranging between 6 min to about 4 h to produce the heated glass-ceramic composition. In certain embodiments, the method further includes performing an ion exchange process on the thermally-tempered glass-ceramic to create a layer of compressive stress in an outer surface region of the glass-ceramic in addition to the compressive stress created by thermal tempering.

According to a third aspect, a method for thermally tempering a glass-ceramic composition comprising a crystalline phase and a residual glass phase comprises heating the glass-ceramic composition to a temperature between about 700° to about 1000° C. to produce heated glass-ceramic composition; and rapidly cooling the heated glass-ceramic composition to a temperature between about 250° C. to about −40° C. by contacting it with a quenching medium to provide a thermally tempered glass-ceramic. In certain embodiments, the glass-ceramic composition is a glass plate having a thickness of about 1 mm to 5 mm.

According to a fourth aspect an article comprises a thermally tempered aluminosilicate glass-ceramic composition a crystalline phase and a residual glass phase, wherein the two phases form a system wherein the thermal expansion curve of the system has two distinct sections diverging from an inflection point temperature in the range of about 450° C. to about 600° C. In certain embodiments, the difference between coefficient of thermal expansion of the glass-ceramic article below and above the inflection point is greater than about 4 ppm/° C. In certain embodiments, the difference between coefficient of thermal expansion of the glass-ceramic article above and below the inflection point is in the range of about 4 ppm/° C. to about 10 ppm/° C. In certain embodiments, the glass-ceramic article comprises a surface and has a compressive stress at the surface of the glass-ceramic is greater than about 60 MPa. In certain embodiments, the compressive stress at the surface of the glass-ceramic is from about 60 MPa to about 330 MPa. In certain embodiments, the article comprises an electronic device, an automotive device, an architectural device, or an appliance device.

The foregoing summary is illustrative only and is not intended to be in any way limiting. In addition to the illustrative aspects, embodiments and features described above, further aspects, embodiments and features will become apparent by reference to the following drawings and the detailed description.

BRIEF DESCRIPTION OF THE DRAWINGS

FIGS. 1A and 1B represent X-ray diffraction of an exemplary glass-ceramic (AX) of the present technology, wherein FIG. 1A illustrates phase assemblage of β-spodumene solid solution, rutile, $ZrTiO_4$ and residual glass, and FIG. 1B illustrates a graph with an expanded scale to show glassy halo corresponding to the presence of residual glass in the glass-ceramic.

DETAILED DESCRIPTION

Figure 1:
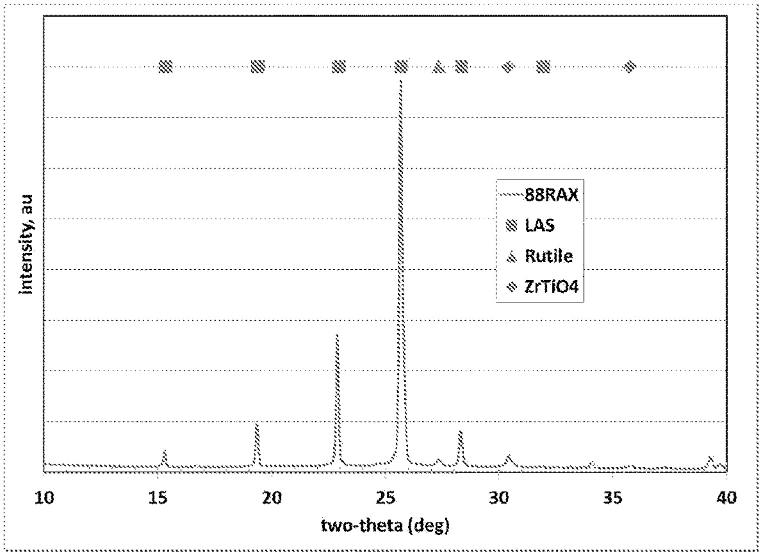
Figure 1:
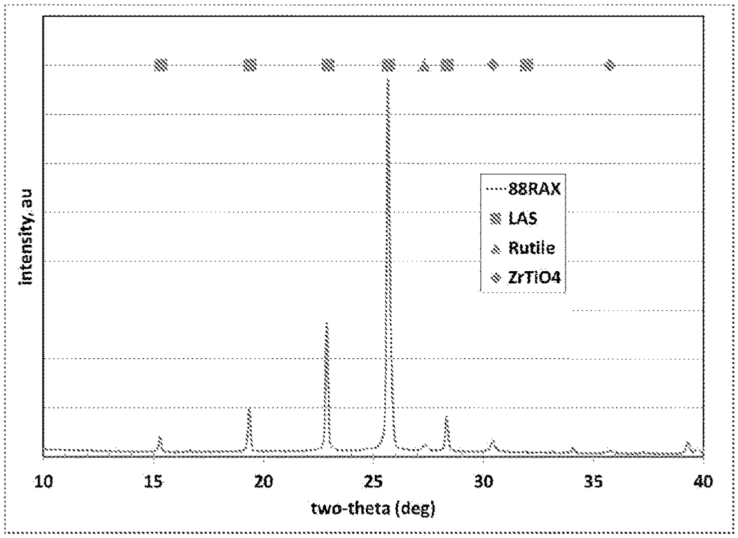

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified. As a non-limiting example, a reference to "X and/or Y" can refer, in one embodiment, to X only (optionally including elements other than Y); in another embodiment, to Y only (optionally including elements other than X); in yet another embodiment, to both X and Y (optionally including other elements).

When a composition herein is given a range of 0-Z mole %, this range refers to the amount of material added to a batch and excludes contaminant levels of the same material. As those skilled in the art would appreciate, metals, for example, sodium and iron, are frequently found at contaminant levels in batched glass and glass-ceramic products. Consequently, it is to be understood that in those cases where a material is not specifically added to a batch, added, any such material that may be present in an analyzed sample of the final glass-ceramic material is contaminant material. Except for iron oxides, where contaminant levels are typically around the 0.03 mole % (300 ppm) level, contaminant levels are less than 0.005 mole % (50 ppm). The term "consistently essentially of" is to be understood as not including contaminant levels of any material.

As used herein, the term "thermally tempered" is understood to mean heat-treated; e.g., with a heated solution or hot gas. The term also includes pre-cursor compositions which are capable of being thermally tempered.

As used herein, the term "inflection point" is understood to mean, a point in the thermal expansion curve where a change in the slope is observed. For example, a glass ceramic composition or article may exhibit two distinct sections diverging from an inflection point such that a section of the curve represents thermal expansion below or before the inflection point and another section represents thermal expansion above or after the inflection point.

As used herein the terms "ceram" and "heat treat" are used interchangeably and the terms "ceramming" and "heat treating" are used interchangeably and include the thermal treatment of precursor glasses to form glass-ceramics.

As used herein, the phrase "main or predominant crystalline phase" means that such a crystalline phase constitutes the greatest percent weight of the all the crystalline phases in the thermally tempered glass-ceramics described herein.

The present disclosure provides a new family of thermally tempered glass-ceramics (GCs). The glass-ceramics are comprised of a low coefficient of thermal expansion (CTE) crystalline phase and a high CTE residual glass composition, the combination of which yields useful degrees of thermal tempering as evidenced by mechanical evaluation. The high mechanical strength of the thermally tempered glass ceramics of the present technology is achieved in part by designing the residual glass to have a high CTE. The resulting profile approximates a parabola with a depth of compression of about 20% or more of the total thickness.

Compositions

Various aspects and/or embodiments of this disclosure relate to glass-ceramics, precursor glass compositions and/or glass-ceramic articles, which are capable of, adapted to thermal tempering or which are thermally tempered. Other aspects and/or embodiments relate to an article including the thermally temperable, glass-ceramics and/or precursor glass compositions. The thermally tempered glass-ceramics may include aluminosilicate glass ceramics. The thermally tempered glass-ceramic materials may include crystalline phases of β-spodumene, mullite, fluorphlogopite or a combination thereof as the main or predominant crystalline phase. Depending on the composition, the thermally tempered glass-ceramics, precursor glass compositions and/or glass-ceramic articles may be characterized as transparent, translucent and/or opaque.

In one aspect, provided herein are thermally tempered aluminosilicate glass-ceramics or glass-ceramic compositions comprising two phases, namely, a crystalline phase and a residual glass phase. In various embodiments, the glass-ceramics include a low CTE crystalline phase and a high CTE residual glass phase. In various embodiments, the two phases of the thermally tempered glass-ceramic forms a system such that the thermal expansion curve of the system has two distinct sections diverging from an inflection point temperature in the range of about 450° C. to about 600° C. In various embodiments, the difference between coefficient of thermal expansion of the glass-ceramic below and above the inflection point is greater than about 4 ppm/° C.

The two phases, namely the crystalline phase and the residual phase, of the thermally tempered glass-ceramic forms a system such that the thermal expansion curve of the system has two distinct sections diverging from an inflection point. The thermal expansion below this inflection point is the thermal expansion of the glass-ceramic (i.e. a mean value between the CTE of the crystalline phase and the CTE of the residual glass, weighted in accordance with their respective amounts). Above the inflection point, which corresponds to the $T_g$ of the residual glass, the increase of thermal expansion is due to the strong increase of the CTE of the residual glass. The glass ceramics can be thermally tempered to significantly increase failure strength (e.g., by almost two times) compared to the as-made materials. This is achieved by designing the composition and subsequent phase assemblage to yield a material having a relatively low CTE and a residual glass giving a high CTE above $T_g$. In one aspect, the thermally tempered GCs are achieved in part by designing the residual glass to have a high coefficient of thermal expansion above $T_g$. Without wishing to be bound to a theory, it is believed that the combination of the low CTE of the glass-ceramic below the inflection point and of a high CTE of the residual glass phase above the inflection point yields useful degrees of thermal tempering as evidenced by mechanical evaluation. It has been observed that a high level of $B_2O_3$ in the residual glass is generally favorable to increase the high temperature CTE of the residual glass (the CTE above $T_g$). In examples given here based respectively on beta-spodumene, mullite and fluoro-phlogopite crystallization, the precursor glass composition contains boron. This element does not enter the crystals (or is present only in a small amount) so that the residual glass is strongly enriched in $B_2O_3$. This is especially true in the case of the spodumene glass-ceramics which present a relatively low amount of residual glass. This could be a possible reason that for these materials, which have high content of $B_2O_3$, a high difference of CTE is observed below and above the inflexion point despite a relatively low amount of residual glass.

In various embodiments, the thermally tempered glass-ceramic composition has a difference between coefficient of thermal expansion of the glass-ceramic above and below the inflection point is in the range of about 4 ppm/° C. to about 10 ppm/° C., including, without limitation, a difference in CTE of about 4.5 ppm/° C. to about 9.5 ppm/° C., about 5 ppm/° C. to about 9 ppm/° C., about 5.5 ppm/° C. to about 8.5 ppm/° C., about 6 ppm/° C. to about 8 ppm/° C., or about 7 ppm/° C. to about 7.5 ppm/° C., or any range including and/or in-between any two of these values.

In various embodiments, the thermally tempered glass-ceramics have a coefficient of thermal expansion of the glass-ceramic from room temperature to the inflection point in the range from about 0.1 ppm/° C. to about 10 ppm/° C. In certain embodiments, the CTE of the glass-ceramic below the inflection point is from about 0.2 ppm/° C. to about 10 ppm/° C., such as from about 0.4 ppm/° C. to about 9 ppm/° C., from about 0.4 ppm/° C. to about 8 ppm/° C., from about 0.4 ppm/° C. to about 6 ppm/° C., from about 0.4 ppm/° C. to about 5 ppm/° C., from about 0.4 ppm/° C. to about 4 ppm/° C., from about 0.5 ppm/° C. to about 8 ppm/° C., from about 0.5 ppm/° C. to about 6 ppm/° C., from about 0.5 ppm/° C. to about 4 ppm/° C., from about 0.6 ppm/° C. to about 10 ppm/° C., from about 0.6 ppm/° C. to about 9 ppm/° C., from about 0.6 ppm/° C. to about 8 ppm/° C., from about 0.6 ppm/° C. to about 6 ppm/° C., from about 0.7 ppm/° C. to about 9 ppm/° C., from about 0.7 ppm/° C. to about 8.0 ppm/° C., from about 0.7 ppm/° C. to about 6.0 ppm/° C., from about 1 ppm/° C. to about 10 ppm/° C., from about 1 ppm/° C. to about 9 ppm/° C., from about 1 ppm/° C. to about 8 ppm/° C., from about 1 ppm/° C. to about 10 ppm/° C., from about 3 ppm/° C. to about 9 ppm/° C., from about 3 ppm/° C. to about 8 ppm/° C., from about 3 ppm/° C. to about 6 ppm/° C., from about 3 ppm/° C. to about 4 ppm/° C., from about 8 ppm/° C. to about 9 ppm/° C., or any range including and/or in-between any two of these values.

In various embodiments, the thermally tempered glass-ceramics have a coefficient of thermal expansion of the glass-ceramic above the inflection point ranges from 4 ppm/° C. to 20 ppm/° C. In certain embodiments, the CTE of the glass-ceramic above the inflection point is from about 4 ppm/° C. to about 19 ppm/° C., from about 4 ppm/° C. to about 18 ppm/° C., from about 4 ppm/° C. to about 15 ppm/° C., from about 4 ppm/° C. to about 12 ppm/° C., from about 4 ppm/° C. to about 10 ppm/° C., from about 5 ppm/° C. to about 20 ppm/° C., such as from about 5 ppm/° C. to about 19 ppm/° C., about 5 ppm/° C. to about 18 ppm/° C., from about 5 ppm/° C. to about 17.5 ppm/° C., from about 5 ppm/° C. to about 12 ppm/° C., from about 5 ppm/° C. to about 10 ppm/° C., from about 6 ppm/° C. to about 20 ppm/° C., from about 6 ppm/° C. to about 18 ppm/° C., from about 6 ppm/° C. to about 15 ppm/° C., from about 6 ppm/° C. to about 10 ppm/° C., from about 9.5 ppm/° C. to about 20 ppm/° C., from about 9.5 ppm/° C. to about 18.0 ppm/° C., from about 9.5 ppm/° C. to about 15.0 ppm/° C., from about 9.5 ppm/° C. to about 10 ppm/° C., from about 16 ppm/° C. to about 20 ppm/° C., from about 16 ppm/° C. to about 19 ppm/° C., from about 16 ppm/° C. to about 18 ppm/° C., or any range including and/or in-between any two of these values.

In various embodiments, the coefficient of thermal expansion of the residual glass phase of the GC is at least 2 ppm/° C. greater than that of the crystalline phase. In certain embodiments, the residual glass phase has a CTE which is at least 2.5 ppm/° C., at least 3 ppm/° C., at least 3.5 ppm/° C., at least 4 ppm/° C., at least 4.5 ppm/° C. or at least 5 ppm/° C. greater than that of the crystalline phase.

Depending on the composition, the inflection point temperature of the glass ceramic is in the range of about 400° C. to about 700° C., such as in the range of about 450° C. to about 600° C., about 465° C. to about 550° C., or about 500° C. to about 550° C., or any range including and/or in-between any two of these values. In various embodiments, the inflection point temperature of the glass ceramic is without limitation, about 450° C., about 455° C., about 465° C., about 467° C., about 470° C., about 475° C., about 480° C., about 485° C., about 490° C., about 495° C., about 500° C., about 505° C., about 510° C., about 515° C., about 520° C., about 525° C., about 530° C., about 535° C., about 540° C., about 545° C., about 550° C., about 555° C., about 560° C., about 565° C., about 570° C., about 575° C., about 580° C., about 585° C., about 590° C., about 595° C., about 600° C., about 605° C., about 610° C., about 615° C. about 620° C., about 625° C., about 630° C., about 635° C., about 640° C., about 645° C., or about 650° C.

Thermal tempering of the glass-ceramic composition leads to compressive stress at the surface (CS). The mechanical properties are dependent on the stress level at the surface and the depth of stress layer. In various embodiments, the thermally tempered glass-ceramic composition has a compressive stress at the surface of the glass-ceramic is greater than about 60 Mpa, including, without limitation, greater than about 65 Mpa, greater than about 70 Mpa, greater than about 75 Mpa, or greater than about 80 Mpa. In certain embodiments, the thermally tempered glass-ceramic composition has a compressive stress at the surface of the glass-ceramic of from about 60 MPa to about 330 Mpa, including, without limitation, from about 65 MPa to about 320 Mpa, from about 70 MPa to about 310 Mpa, from about 75 MPa to about 300 Mpa, from about 80 MPa to about 280 Mpa, from about 90 MPa to about 250 Mpa, from about 100 MPa to about 220 Mpa, from about 110 MPa to about 200 Mpa, from about 120 MPa to about 180 Mpa, from about 130 MPa to about 160 Mpa, or from about 140 MPa to about 150 Mpa, or any range including and/or in-between any two of these values.

In certain embodiments, the depth of a stress layer for thermally tempered glass-ceramic article is greater than about 15% or greater than about 20% of the total thickness of the thermally tempered glass-ceramic article. In certain embodiments, the depth of a stress layer for thermally tempered glass-ceramic article is in the range of about 15% to about 50% of the total thickness of the article, including, without limitation about 17% to about 45%, about 18% to about 40%, about 19% to about 35%, about 20% to about 30%, about 20% to about 28%, or about 22% to about 25% of the total thickness of the thermally tempered glass-ceramic article, or any range including and/or in-between any two of these values.

In certain embodiments, the crystalline phases constitutes greater than about 10%, greater than about 20%, greater than about 30% or greater than about 45% of the total weight of the thermally tempered glass-ceramic article. In certain embodiments, the crystalline phases constitutes about 20% to about 90% of the total weight of the thermally tempered glass-ceramic article, including without limitation about 25% to about 85%, about 30% to about 80%, about 35% to about 75%, about 40% to about 70%, about 45% to about 65%, or about 50% to about 60% of the ceramic phase of the total weight of the thermally tempered glass-ceramic article, or any range including and/or in-between any two of these values.

In certain embodiments, the residual glass phase constitutes greater than about 10%, greater than about 20%, greater than about 30% or greater than about 45% of the total weight of the thermally tempered glass-ceramic article. In certain embodiments, the residual glass phase constitutes about 10% to about 80% of the total weight of the thermally tempered glass-ceramic article, including without limitation about 15% to about 75%, about 20% to about 70%, about 25% to about 65%, %, about 30% to about 60%, about 35% to about 55%, or about 40% to about 50% of the residual glass phase of the total weight of the thermally tempered glass-ceramic article, or any range including and/or in-between any two of these values.

In various embodiments, the thermally tempered glass-ceramic composition has a Young's modulus of at least 65 GPa, which may minimize flexing of the GC during processing and prevent damage to devices attached to the GC. In certain embodiments, the thermally tempered glass-ceramic composition has a Young's modulus of greater than 65 GPa, greater than 70 GPa, greater than 75 GPa, greater than 80 GPa, greater than 85 GPa, greater than 90 GPa, greater than 95 GPa, or greater than 100 GPa. In certain embodiments, the thermally tempered glass-ceramic composition has a Young's modulus of less than 120 GPa, less than 115 GPa, less than 110 GPa, less than 105 GPa, or less than 100 GPa. In some particular embodiments, the thermally tempered glass-ceramic composition has a Young's modulus from about 70 GPa to about 110 GPa, such as from about 80 GPa to about 100 GPa, from about 80 GPa to about 95 GPa, from about 80 GPa to about 90 GPa, from about 80 GPa to about 85 GPa, from 85 GPa to about 100 GPa, from about 85 GPa to about 95 GPa, from about 85 GPa to about 90 GPa, from 90 GPa to about 100 GPa, from about 90 GPa to about 95 GPa, from 95 GPa to about 100 GPa, or any range including and/or in-between any two of these values. However, it is contemplated that desired properties, including the Young's modulus, can vary depending on the particular embodiment, end use, and processing requirements for the thermally tempered glass-ceramic composition. In some embodiments, the glass-ceramic composition has a Young's modulus of about 70 GPa to about 110 GPa.

In another aspect, the present technology relates to the precursor or base glass compositions and glasses utilized to form the thermally tempered glass-ceramics described herein.

The precursor glass compositions for the thermally temperable glass-ceramics may in one embodiment include, in mole percent on an oxide basis, $SiO_2$ in the range from about 65 to about 75; $Al_2O_3$ in the range from about 8 to about 13; $Li_2O$ in the range from about 3 to about 13; $B_2O_3$ in the range from about 0.02 to about 5; $K_2O$ in the range from about 0.5 to about 2; BaO in the range from about 0 to about 2; and $RO_2$ in the range of about 2 to about 6; wherein $RO_2$ includes $TiO_2$ in the range from about 1 to about 4; $ZrO_2$ in the range from about 0 to about 2; and $SnO_2$ in the range from about 0 to about 1.

The precursor glass compositions for the thermally temperable glass-ceramics may in other embodiment include, in mole percent on an oxide basis, $SiO_2$ in the range from about 55 to about 65; $Al_2O_3$ in the range from about 13 to about 19; $Li_2O$ in the range from about 0 to about 4; $B_2O_3$ in the range from about 12 to about 17; $K_2O$ in the range from about 1 to about 4; MgO in the range from about 2 to about 8.

In yet another embodiment, the precursor glass compositions for the thermally temperable glass-ceramics may include, in weight percent on an oxide basis, $SiO_2$ in the range from about 40 to about 55; $Al_2O_3$ in the range from about 12 to about 20; MgO in the range from about 10 to about 18; $B_2O_3$ in the range from about 5 to about 10; F in the range from about 4 to about 8; BaO in the range from about 0 to about 2; $ZrO_2$ in the range from about 0 to about 2; and $R_2O$ in the range of about 0 to about 16; wherein $R_2O$ includes $K_2O$ in the range from about 5 to about 13; $Li_2O$ in the range from about 0 to about 2; and $Na_2O$ in the range from about 0 to about 2. In certain embodiments, the thermally temperable glass-ceramic comprises or consists of, in weight percent on an oxide basis, 25-60% $SiO_2$, 15-35% $R_2O_3$, wherein $R_2O_3$ consists of 3-15% $B_2O_3$ and 5-25% $Al_2O_3$, 4-25 MgO+0-7% $Li_2O$, the total of MgO+$Li_2O$ being between about 6-25%, 2-20% $R_2O$, wherein $R_2O$ consists of 0-15% $Na_2O$, 0-15% $K_2O$, 0-15% $Rb_2O$, and 0-20% $Cs_2O$, and 4-20% F. In some embodiments, the thermally temperable glass-ceramic comprises or consists of, in mole percent on an oxide basis, $SiO_2$ 42.2% $SiO_2$, 6.6% $B_2O_3$, 8.8% $Al_2O_3$, 19.3% MgO, 17.8% F, and 5.4% $K_2O$.

In certain embodiments, the precursor glass for thermally temperable glass-ceramic comprises or consists of, in mole percent on an oxide basis, of 65 to 75% $SiO_2$, 8 to 13 $Al_2O_3$, 3 to 13% $Li_2O$, 0.02 to 5% $B_2O_3$, 0.5 to 2% $K_2O$, 0 to 2% BaO, 1 to 4% $TiO_2$, 0 to 2% $ZrO_2$ and 0 to 1% $SnO_2$, wherein the main or predominant crystalline phase of said glass-ceramic includes beta-spodumene.

In certain embodiments, the precursor glass for thermally temperable glass-ceramic comprises or consists of, in mole percent on an oxide basis, 55 to 65% $SiO_2$, 13 to 19% $Al_2O_3$, 0 to 4% $Li_2O$, 12 to 17% $B_2O_3$, 1 to 4% $K_2O$, and 2 to 8% MgO, wherein the main or predominant crystalline phase of said glass-ceramic is mullite.

In other embodiments, the thermally temperable glass-ceramic comprises or consists of, in weight percent on an oxide basis, 40 to 55% $SiO_2$, 12 to 20% $Al_2O_3$, 10 to 18% MgO, 4 to 8% F, 5 to 10% $B_2O_3$, 0 to 2% BaO, 0 to 2% $ZrO_2$, 5 to 13% $K_2O$, 0 to 2% $Li_2O$, and 0 to 2% $Na_2O$, and wherein the main or predominant crystalline phase of said glass-ceramic is fluorphlogopite.

In certain embodiments, $SiO_2$ may serve as the primary glass-forming oxide. Accordingly, In certain embodiments, $SiO_2$ may be present in the thermally temperable glass-ceramics, precursor glass compositions and/or glass-ceramic articles that includes such a composition described herein, in mole % in the range from about 35 to about 80, including from about 35 to about 45, from about 40 to about 60, from about 40 to about 55, from about 40 to about 50, from about 50 to about 70, from about 50 to about 65, from about 50 to about 60, from about 55 to about 80, from about 55 to about 75, from about 55 to about 65, from about 55 to about 60, from about 60 to about 80, from about 60 to about 75, from about 60 to about 70, from about 60 to about 65, from about 65 to about 80, from about 65 to about 75, from about 65 to about 70, from about 70 to about 80, from about 70 to about 75, or from about 75 to about 80, or any range including and/or in-between any two of these values.

The thermally temperable glass-ceramics, precursor glass compositions and/or glass-ceramic articles may or may not include $Al_2O_3$. Accordingly, in certain embodiments, $Al_2O_3$ may be present in the thermally temperable glass-ceramics, precursor glass compositions and/or glass-ceramic articles that includes such a composition described herein, in mole % in the range from about 0 to about 25, including from about 5 to about 25, from about 8 to about 20, from about 8 to about 15, from about 8 to about 13, from about 8 to about 10, from about 10 to about 20, from about 10 to about 15, from about 12 to about 25, from about 12 to about 20, from about 12 to about 15, from about 13 to about 25, from about 13 to about 20, from about 13 to about 18, or from about 13 to about 15, or any range including and/or in-between any two of these values.

In certain embodiments, the thermally temperable glass-ceramics, precursor glass compositions and/or glass-ceramic articles include one or more alkali metal oxides or alkali oxides $R_2O$ (e.g., $Li_2O$, $Na_2O$, $K_2O$, or the like) that are collectively (i.e., $Na_2O$+$K_2O$+$Li_2O$) present, in mole % in an amount in the range from about 0 to about 20, from about 0 to about 16, from about 0 to about 5, from about 0 to about 2, from about 0 to about 1, from about 1 to about 15, from about 1 to about 10, from about 1 to about 5, from about 1 to about 4, from about 2 to about 15, from about 2 to about 10, from about 2 to about 6, from about 4 to about 12, from about 4 to about 10, from about 4 to about 6, from about 5 to about 20, from about 5 to about 15, from about 5 to about 13, from about 5 to about 10, from about 8 to about 20, or from about 8 to about 15, or any range including and/or in-between any two of these values. The alkali oxides facilitate the melting of the glass composition and lower the softening point of the glass, thereby offsetting the increase in the softening point due to higher concentrations of $SiO_2$ and/or $Al_2O_3$ in the glass composition. The alkali oxides also assist in tuning the CTE to a desired value.

In certain embodiments, the alkali oxide present in the thermally temperable glass-ceramics, precursor glass compositions and/or glass-ceramic articles is $Na_2O$, which may be present, in mole % in an amount in the range from about 0 to about 20, from about 2 to about 20, from about 3 to about 20, from about 5 to 20, from about 1 to about 15, from about 2 to about 15, from about 3 to about 15, from about 5 to about 15, from about to 8 to about 15, from about 1 to about 10, from about 2 to about 10, from about 3 to about 10, from about 5 to about 10, from about to 8 to about 10, from about 1 to about 8, from about 2 to about 8, from about 3 to about 8, from about 4 to about 8, from about 5 to about 8, from about 6 to about 8, from about 7 to about 8, from about 1 to about 5, from about 2 to about 5, from about 2 to about 4, from about 0 to about 5, from about 0 to about 4, from about 0 to about 3, or from about 0 to about 2, or any range including and/or in-between any two of these values.

In certain embodiments, the alkali oxide present in the thermally temperable glass-ceramics, precursor glass compositions and/or glass-ceramic articles is $K_2O$, which may be present, in mole % in the range from about 0 to about 20, from about 1 to about 20, from about 2 to about 20, from about 3 to about 20, from about 5 to 20, about 0 to about 15, from about 1 to about 15, from about 2 to about 15, from about 3 to about 15, from about 5 to about 15, from about to 8 to about 15, about 0 to about 10, from about 1 to about 10, from about 2 to about 10, from about 3 to about 10, from about 4 to about 10, from about 5 to about 10, from about to 8 to about 10, about 0 to about 8, from about 1 to about 8, from about 2 to about 8, from about 3 to about 8, from about 4 to about 8, from about 5 to about 8, from about 6 to about 8, from about 7 to about 8, about 2 to about 7, from about 2 to about 6, from about 2 to about 5, from about 2 to about 4, from about 2 to about 3, about 1 to about 4, from about 1 to about 3, from about 1 to about 2, from about 0 to about 4, from about 0 to about 3, or from about 0 to about 2, or any range including and/or in-between any two of these values.

In certain embodiments, the alkali oxide present in the thermally temperable glass-ceramics, precursor glass compositions and/or glass-ceramic articles is $Li_2O$, which may be present, in mole % in an amount in the range from about 0 to about 20, including from about 1 to about 20, from about 2 to about 20, from about 3 to about 20, from about 5 to 20, about 0 to about 15, from about 1 to about 15, from about 2 to about 15, from about 3 to about 15, from about 5 to about 15, from about to 8 to about 15, about 0 to about 13, from about 1 to about 13, from about 2 to about 13, from about 3 to about 13, from about 4 to about 13, from about 5 to about 13, from about to 8 to about 13, about 0 to about 8, from about 1 to about 8, from about 2 to about 8, from about 3 to about 8, from about 4 to about 8, from about 5 to about 8, from about 6 to about 8, from about 7 to about 8, about 2 to about 7, from about 2 to about 6, from about 2 to about 5, from about 2 to about 4, from about 2 to about 3, from about 1 to about 4, from about 1 to about 3, from about 1 to about 2, from about 0 to about 4, from about 0 to about 3, or from about 0 to about 2, or any range including and/or in-between any two of these values. In certain embodiments, $Li_2O$ is used as a primary alkali during thermally tempered process.

The thermally temperable glass-ceramics, precursor glass compositions and/or glass-ceramic articles may or may not include MgO. Accordingly, in certain embodiments, the thermally temperable glass-ceramics, precursor glass compositions and/or glass-ceramic articles include MgO, which may be present, in mole %, in an amount in the range from about 0 to about 25, from about 2 to about 20, from about 2 to about 15, from about 2 to about 10, from about 2 to about 6, from about 2 to about 5, from about 2 to about 4, from about 4 to about 20, from about 4 to about 15, from about 4 to about 10, from about 4 to about 6, from about 10 to about 25, from about 10 to about 20, from about 10 to about 18, from about 10 to about 15, from about 15 to about 20, or from about 15 to about 18, or any range including and/or in-between any two of these values.

In certain embodiments, the thermally temperable glass-ceramics, precursor glass compositions and/or glass-ceramic articles may optionally include $B_2O_3$. For example, $B_2O_3$ may be present, in mole %, in an amount in the range from about 0 to about 20, including from about 0.01 to about 10, from about 0.01 to about 5, from about 0.02 to about 10, from about 0.02 to about 5, from about 0.02 to about 4, from about 0.02 to about 2, from about 0.1 to about 10, from about 0.1 to about 5, from about 0.1 to about 2, from about 1 to about 10, from about 1 to about 5, from about 5 to about 20, from about 5 to about 15, from about 5 to about 10, from about 10 to about 20, from about 10 to about 15, from about 10 to about 12, from about 12 to about 20, from about 12 to about 18, from about 12 to about 16, from about 12 to about 15, from about 15 to about 20, from about 15 to about 18, or any range including and/or in-between any two of these values.

In certain embodiments, the thermally temperable glass-ceramics, precursor glass compositions and/or glass-ceramic articles include one or more transition or post-transition metal oxides $RO_2$ (e.g., $TiO_2$, $ZrO_2$, $SnO_2$) that are collectively present, in mole % in an amount in the range from about 0 to about 20, from about 0 to about 16, from about 0 to about 5, from about 0 to about 2, from about 0 to about 1, from about 1 to about 15, from about 1 to about 10, from about 1 to about 5, from about 1 to about 4, from about 2 to about 15, from about 2 to about 10, from about 2 to about 6, from about 4 to about 12, from about 4 to about 10, from about 4 to about 6, from about 5 to about 20, from about 5 to about 15, from about 5 to about 13, from about 5 to about 10, from about 8 to about 20, or from about 8 to about 15, or any range including and/or in-between any two of these values.

In certain embodiments, the thermally temperable glass-ceramics, precursor glass compositions and/or glass-ceramic articles include $TiO_2$, which may be present, present, in mole % in an amount in the range from about 0 to about 15, from about 0 to about 10, from about 0 to about 5, from about 0 to about 2, from about 0 to about 1, from about 1 to about 15, from about 1 to about 10, from about 1 to about 5, from about 1 to about 4, from about 1 to about 3, from about 2 to about 15, from about 2 to about 10, from about 2 to about 6, from about 4 to about 12, from about 4 to about 10, from about 4 to about 6, from about 10 to about 15, from about 5 to about 15, from about 5 to about 13, or from about 5 to about 10, or any range including and/or in-between any two of these values.

In certain embodiments, the thermally temperable glass-ceramics, precursor glass compositions and/or glass-ceramic articles include $ZrO_2$, which may be present, in mole %, in the range from about 0 to about 10, from about 0 to about 8, from about 0 to about 7, from about 0 to about 6, from about 0 to about 5, from about 0 to about 4, from about 0 to about 3.5, from about 0 to about 3, from about 0 to about 2.5, from about 0 to about 2, from about 0 to about 1.5, from about 0 to about 1, from about 0 to about 0.5, from about 0.1 to about 5, from about 0.1 to about 4, from about 0.1 to about 3.5, from about 0.1 to about 3, from about 0.1 to about 2.5, from about 0.1 to about 2, from about 0.1 to about 1.5, from about 0.1 to about 1, from about 0.5 to about 4.5, from about 1 to about 4, from 1.5 to about 3.5, or from about 2 to about 3, or any range including and/or in-between any two of these values.

In certain embodiments, the thermally temperable glass-ceramics, precursor glass compositions and/or glass-ceramic articles include $SnO_2$, which may be present, in mole %, in the range from about 0 to about 10, including from about 0.01 to about 10, from about 0.01 to about 5, including from about 0.01 to about 1, from about 0.02 to about 10, from about 0.02 to about 5, from about 0.02 to about 4, from about 0.02 to about 2, from about 0.02 to about 1, from about 0.1 to about 10, from about 0.1 to about 5, from about 0.1 to about 2, from about 0.1 to about 1, from about 0.5 to about 10, from about 0.5 to about 5, from about 0.5 to about 2, or from about 0.5 to about 1, or any range including and/or in-between any two of these values.

In certain embodiments, the thermally temperable glass-ceramics, precursor glass compositions and/or glass-ceramic articles include F, which may be present, in mole %, in the range from about 1 to about 12, including from about 1 to about 10, from about 1 to about 8, from about 1 to about 7, from about 1 to about 6, from about 1 to about 5, from about 1 to about 4, from about 2 to about 9, from about 2 to about 8, from about 3 to about 8, from about 3 to about 6, from about 3 to about 4, from about 4 to about 10, from about 4 to about 9, from about 4 to about 8, from about 4 to about 7, from about 4 to about 6, from about 4 to about 5, from about 5 to about 10, from about 5 to about 9, from about 5 to about 8, from about 5 to about 7, from about 5 to about 6, from about 6 to about 10, from about 6 to about 9, from about 6 to about 8, from about 6 to about 7, from about 7 to about 8, or any range including and/or in-between any two of these values.

In certain embodiments, the main or predominant crystalline phase may be such that it includes a principal crystalline phases selected from the group consisting of mullite, fluorphlogopite and beta-spodumene, beta-quartz solid solutions, or a combination thereof. For example, in certain embodiments a beta-spodumene crystalline phase may comprise the main or predominant crystalline phase in the thermally temperable glass-ceramic articles. In other embodiments, a mullite crystalline phase may comprise the main or predominant crystalline phase in the thermally temperable glass-ceramic articles. In yet other embodiments, a fluorphlogopite crystalline phase may comprise the main or predominant crystalline phase in the thermally temperable glass-ceramic articles. In other embodiments, a beta-quartz crystalline phase may comprise the main or predominant crystalline phase in the thermally temperable glass-ceramic articles. In one or more embodiments, the glass-ceramic compositions described herein can be thermally tempered. In one or more embodiments, the glass-ceramic compositions described herein are thermally tempered. In one or more embodiments, the glass-ceramic compositions comprise or consists of thermally tempered glass ceramic.

An example of a fluorphlogopite glass is the commercially machinable glass Macor® (Corning Incorporated, Corning, N.Y.). Macor® microstructure comprises 55% fluorphlogopite mica and 45% borosilicate glass. Macor® offers a unique combination of properties, in being non-wetting, white, odorless and non-outgassing material that exhibits zero porosity. Extremely machinable, Macor® offers tight tolerances capabilities, allowing complicated shape design (optimal performances up to +/−0.013 mm for dimensions, <0.5 μm for finished surface and up to 0.013 μm for polished surface). Macor® remains continuously stable at 800° C., with a maximum peak at 1000° C. under no load, and unlike ductile materials, does not creep or deform. Its coefficient of thermal expansion readily matches most metals and sealing glasses. As an electric insulator, particularly at high temperatures, it is excellent at high voltages and a broad spectrum of frequencies. However, the mechanical strength of this material is not outstanding and could be improved by the thermal tempering methods described herein.

In another aspect, provided is an article comprising the thermally temperable or thermally tempered glass-ceramics disclosed herein. In yet another aspect, provided is an article comprising the thermally tempered glass-ceramic comprising, in mole percent on an oxide basis, of 50 to 70% $SiO_2$, 0 to 20% $Al_2O_3$, 12 to 23% MgO, 0 to 4% $Li_2O$, 0 to 10% $Na_2O$, 0 to 10% $K_2O$, 0 to 5% $ZrO_2$, and 2 to 12% F, wherein the main or predominant crystalline phase of said glass-ceramic is beta-spodumene.

In another aspect, provided herein is an article including the thermally tempered glass-ceramics described herein.

Methods

Another aspect of the present technology relates to methods for producing the thermally tempered glass-ceramics, precursor glass compositions and/or thermally tempered glass-ceramic articles described herein.

Aspects of the present technology relate to a method for manufacturing thermally tempered glass-ceramics. In various embodiments, a method for thermally tempering a glass-ceramic article comprising a crystalline phase and a residual glass phase includes heating the glass-ceramic article to a temperature between an annealing point and a softening point of the residual glass phase to produce heated glass-ceramic article, and rapidly cooling the heated glass-ceramic article to provide a thermally tempered glass-ceramic article. In various embodiments, the thermal tempering is conducted on fully cerammed glass materials, i.e., following the ceramming and cooling of the cerammed glass material.

In various embodiments, rapid cooling of the heated glass-ceramic article can be performed by contacting the heated glass-ceramic with a quenching or cooling medium. Suitable quenching medium is one that provides a relatively high average heat transfer coefficient over the entire range of temperature employed in the tempering process. The quenching medium may be a liquid, a solid or a gas. Suitable gas quenching medium may include cool air or carbon dioxide gas. Suitable liquid quenching medium includes, without limitation, oils, water, glycols, liquid nitrogen and the like or combinations thereof. In certain embodiments, the liquid quenching medium includes a vegetable oil. In certain embodiments, the vegetable oil is selected from the group consisting of peanut oil, high oleic sunflower oil, canola oil, soybean oil, corn oil, olive oil, sunflower oil, safflower oil, cottonseed oil, and the like or combinations thereof. In certain embodiments, the quenching medium includes peanut oil. In certain embodiments, the heated glass-ceramic article may by contacted with a quenching medium by dipping or submerging the GC article in to a bath of liquid quenching medium or by spraying or atomizing the quenching medium on to the GC article.

In various embodiments of the method for thermally tempering the glass-ceramic, the glass-ceramic is first heated to a high temperature, usually between an annealing point and a softening point of the residual glass phase, e.g., close to the softening point of the residual glass in the particular GC being tempered. The temperature at the softening point of the glass will vary depending on the particular composition of the glass phase of the GC. For example, in a borosilicate glass composition the softening temperature can be about 815° C. (1500° F.). Accordingly, the glass-ceramic may be heated to a suitable temperature, such as between about 600° to about 1100° C. to produce heated glass-ceramic article. In certain embodiments, the GC is heated to a temperature in the range of about 700° C. to about 1000° C., such as about 730° C. to about 960° C., about 750° C. to about 950° C., or about 800° C. to about 900° C., or any range including and/or in-between any two of these values. In certain embodiments, the GC is heated to a temperature of about 700° C., about 710° C., about 720° C., about 730° C., about 740° C., about 750° C., about 760° C., about 770° C., about 780° C., about 790° C., about 800° C., about 810° C., about 820° C., about 830° C., about 840° C., about 850° C., about 860° C., about 870° C., about 880° C., about 890° C., about 900° C., about 910° C., about 920° C., about 930° C., about 940° C., about 950° C., about 960° C., about 970° C., about 980° C., about 990° C., or about 1000° C.

In various embodiments, the glass-ceramic is heated to a temperature in the range of about 750° C. to about 950° C. for a suitable time to produce the heated glass-ceramic article. Suitable heating time is in the range of about 5 min to about 4 h, such as about 10 min to about 3.5 h, about 15 min to about 3 h, about 30 min to about 2.5 h, about 45 min to about 2 h, or about 1 h to about 1.5 h, or any range including and/or in-between any two of these values.

After the GC has been heated to the elevated temperature, it is rapidly cooled by immediately contacting with a quenching medium where heat is exchanged between the surface of the GC and the quenching medium to provide a thermally tempered glass ceramic. In certain embodiments, the heated glass-ceramic is rapidly cooled to a temperature between about 250° C. to about −40° C. by contacting it with a quenching medium. In certain embodiments, the heated glass-ceramic is rapidly cooled to a temperature in the range of about 250° C. to about −40° C., such as about 225° C. to about −30° C., about 200° C. to about −20° C., about 150° C. to about −10° C., about 100° C. to about 0° C., such as about 80° C. to about 10° C., about 60° C. to about 15° C., or about 50° C. to about 25° C., or any range including and/or in-between any two of these values.

The quenching medium is maintained at a temperature in the range of about 10° C. to about 50° C. prior to contacting it with the heated glass-ceramic. In certain embodiments, prior to contacting it with the heated glass-ceramic, the quenching medium is maintained at a temperature in the range of about 10° C. to about 50° C., such as about 15° C. to about 45° C., about 20° C. to about 40° C., about 25° C. to about 35° C., or about 28° C. to about 30° C., or any range including and/or in-between any two of these values. In certain embodiments, the quenching medium is maintained at room temperature prior to contacting it with the heated glass-ceramic. In certain embodiments, the quenching medium is maintained at a temperature of about 25° C. prior to contacting it with the heated glass-ceramic.

The temperature range used in the tempering process is defined in terms of the surface temperature of the GC from an upper temperature near its softening point down to a lower surface temperature at which the interior of the glass has cooled through the glass strain point. The glass strain point as used herein is that condition in which glass has a viscosity of 10^14.5 poises. When glass has been cooled through the strain point throughout its thickness, the final degree of temper in the glass has been attained. Where σ=surface compression, E=E mod (GPa), ν is Poisson's ratio, and ΔL/L is determined from the CTE curve at $T_0$ and $T_q$. To is the heating temperature for tempering and $T_q$ is taken as the point in the CTE curve where the slope changes The fast quench rate yields a gradient in temperature through the GC article. The article surfaces cool faster than the interior, causing contraction of the surfaces while the interior is still relatively hot. Eventually the core cools but its contraction is resisted by the solid outer surfaces. These temperature and accompanying contraction differences then result in compressive stresses developing at the surfaces with the center producing balancing tensile stress. The stress profile replicates the quenching thermal profile, which is well approximated as a parabola. The degree of temper is dependent on the article thickness (t), the difference in temperature between heating temperature $T_0$ and the quench temperature ($\Delta T=T_0-T_q$), the quench rate, the thermal conductivity of the material and the thermal expansion (CTE) and Young's modulus (E mod) and Poisson's ratio of the glass in the GC composition.

In various embodiments, the glass-ceramic has a thickness of about 1 to about 5 millimeters (mm), including from about 1.2 mm to about 4.8 mm, about 1.5 mm to about 4.5 mm, about 1.8 mm to about 4.0 mm, about 2 mm to about 3.8 mm, about 2.5 mm to about 3.5 mm, or about 2.8 mm to about 3.0 mm, or any range including and/or in-between any two of these values. In certain embodiments, the glass-ceramic has a thickness of about 3 mm.

In the present technology the residual glass in the GC is advantageously used to induce tempering stresses in the GC. Cooling stresses are installed in multiphase materials such as glass-ceramics when they are cooled from high temperature. These stresses arise from the CTE mismatch of the different phases and are manifested as localized stress fields in the material near and at the phase interfaces. Both microscopic and macroscopic tempering stresses are introduced during tempering resulting in compression at the surface, with balancing tension on the interior.

Following thermal tempering treatment, the glass-ceramic may be further treated by any conventional method known in the art, for instance, removing the quenching medium, cleaning, drying and forming the thermally tempered GC material in to a desired shape. In certain embodiments, the thermally tempered GC can be subjected to ion exchange to affect a higher amount of compression at the surface of the parts. In certain embodiments, performing an ion exchange process on the thermally-tempered glass-ceramic may create a layer of compressive stress in an outer surface region of the glass-ceramic in addition to the compressive stress created by thermal tempering. Ion-exchange is generally conducted in a bath of molten salt. For example, the thermally tempered glass-ceramic materials can be ion-exchanged in sodium and/or potassium-containing baths, using any of the nitrates, sulfate and halide baths, pure or mixed. Typical temperatures for ion exchange are between 390° C. and 500° C., however in some embodiments temperatures above 500° C. can also be used. Ion exchange durations can range from short times, such as about 10 min to longer times of about 20 h.

In certain embodiments, the thermally tempered GCs can undergo ion exchange to impart a higher level of compressive stress on the surface. In certain embodiments, the thermally tempered GCs can undergo ion exchange to impart compressive stress of from about 80 to 800 MPa, including, without limitation, about 100 to about 750 Mpa, about 150 to about 700 Mpa, about 200 to about 650 Mpa, about 250 to about 600 Mpa, with about 300 to about 550 Mpa, about 350 to about 500 Mpa, about 400 to about 450 Mpa, or any range including and/or in-between any two of these values. In certain embodiments, the thermally tempered GCs can undergo ion exchange to impart high compressive stress with a depth of layer from about 1 to about 40 microns, including, without limitation, about 2 to about 38 microns, about 5 to about 35 microns, about 10 to about 30 microns, about 15 to about 25 microns, about 10 to about 20 microns, or any range including and/or in-between any two of these values.

The glass-ceramics used for thermal tempering process can be produced by methods which include melting a batch of precursor glasses at a suitable temperature, in a suitable melting apparatus for a sufficient period of time to melt the batch of precursor glasses, annealing and ceramming the molten glasses at a suitable growth temperature; and optionally cooling the glass-ceramic to room temperature.

The pre-cursor or base glasses are disclosed herein and may include, in mole percent on an oxide basis, of 65 to 75% $SiO_2$, 8 to 13 $Al_2O_3$, 3 to 13% $Li_2O$, 0.02 to 5% $B_2O_3$, 0.5 to 2% $K_2O$, 0 to 2% BaO, 1 to 4% $TiO_2$, 0 to 2% $ZrO_2$ and 0 to 1% $SnO_2$; or 55 to 65% $SiO_2$, 13 to 19% $Al_2O_3$, 1 to 4% $Li_2O$, 12 to 17% $B_2O_3$, 1 to 4% $K_2O$, and 2 to 7% MgO; or 40 to 55% $SiO_2$, 12 to 20% $Al_2O_3$, 10 to 18% MgO, 4 to 8% F, 5 to 10% $B_2O_3$, 0 to 2% BaO, 0 to 2% $ZrO_2$, 5 to 13% $K_2O$, 0 to 2% $Li_2O$, and 0 to 2% $Na_2O$.

Depending on the composition, the precursor glasses can be melted at a temperature in the range of about 800 to about 2000° C., such as at a temperature in the range of 1200-1600° C., or at a temperature in the range of about 1400° C. to about 1500° C., in a suitable apparatus, e.g., a covered platinum crucible, for a time sufficient to melt the glasses, such as e.g., about 30 min to about 20 h, including about 2 h to about 10 h, about 3 h to about 6 h. After melting and fining, the glasses were poured and annealed at a temperature of about 500° C. to about 700° C. The annealed glasses were cerammed and held at a suitable growth temperature, e.g., of about 700° C. to about 1100° C., following which the resulting materials were left to cool at furnace rate.

The ceramming step may include, for example, nucleation and growth steps. The nucleation step may include heating a furnace from room temperature to a first temperature ranging from about 700° C. to about 850° C., such as from about 750° C. to about 800° C., at a ramp rate ranging from about 1 to about 15° C./min, such as about 5° C./min or 10° C./min, and holding the furnace at the first temperature for a time ranging from about 0.5 to about 5 hours, such as from about 2 to about 4 hours, or any range including and/or in-between any two of these values. The growth step may, in certain embodiments, include heating the furnace to a second temperature ranging from about 700° C. to about 1100° C., such as from about 820° C. to about 1050° C., at a ramp rate ranging from about 1 to about 15° C./min, such as about 5° C./min or 10° C./min, and holding the furnace at the second temperature for a time ranging from about 1 to about 16 hours, such as from about 2 to about 10 hours, or any range including and/or in-between any two of these values. Other ceramming schedules are known in the art and may be used in accordance with the disclosure to convert the precursor glass into a glass-ceramic. For example, the glasses can be cerammed at lower temperature leading to transparent glass-ceramics with β-quartz SS as the main or predominant crystalline phase, which will present a thermal expansion curve showing a low expansion below and high expansion above the inflection point of about 500° C.

The glass-ceramic may be further treated by any conventional method known in the art, for example, cooling to room temperature, polishing, milling, etc. In certain embodiments, the glass-ceramic article may be directly quenched from the high ceramming temperature by rapidly cooling the heated glass-ceramic article to a temperature between about 250° C. to about −40° C. by contacting it with a liquid or gas to provide a thermally tempered glass-ceramic. The glass-ceramic article is thermally tempered separately after it has been fully cerammed and cooled.

In some embodiments, the method may further include subjecting the thermally tempered glass-ceramic to chemical strengthening process to provide a chemically-strengthened glass-ceramic that has, for example, a superimposed compressive layer on the surface. In some embodiments, the chemical strengthening method includes subjecting the glass-ceramic article to ion exchange treatment to provide an ion-exchanged glass ceramic-article, after ceramming the glass article or even without ceramming the glass article. In some embodiments, the precursor glass may also be subjected to ion exchange treatment to provide an ion-exchanged glass. The ion-exchange process may be a single step process or a multi-step process and use a single alkali ion bath or a bath with a combination of two or more alkali ions.

In some embodiments, provided is a method for forming a thermally tempered glass-ceramic, wherein the method includes melting a batch and forming a glass comprising the precursor glass materials as described herein; casting, annealing, ceramming, optionally cooling, and thermally tempering the glass-ceramic by contacting it with a quenching medium.

The thermally tempered glass-ceramics described herein may be used for a variety of applications including articles such as electronic devices, automotive devices, appliances and architectural devices such as walls, tiles, countertops, floors, ceilings and the like. In certain embodiments, the thermally tempered glass-ceramics may be used in to manufacture architectural windows and in automobile glazing.

The thermally tempered glass-ceramics described herein have improved properties, such as increased mechanical strength over the non-tempered glass ceramics. Mechanical performance of strengthened glass is directly related to the shape of the stress profile, e.g. the depth of layer and the magnitude of the compressive stress present at a particular depth. The greater the depth of the compressive layer and the greater the compressive stress in the glass, then the stronger and more fracture resistant and fracture propagation resistant the glass will be. For example, high compressive stress in the surface region of thermally tempered glass product or article inhibits fracture formation in the surface, provides scratch resistance and inhibits fracture propagation from any fractures defects that exist or are created in the surface.

The thermally tempered glass-ceramics described herein have several advantages over chemically strengthened glass-ceramics, e.g., ion-exchanged glass ceramics. For example, thermal tempering advantageously delivers materials with improved mechanical performance in shorter times than those required for ion exchange, without the need for expensive ion exchange baths and materials. Stress installation by thermal tempering can be performed on cool-down from ceramming or on cerammed glass materials. The resulting stress profiles are parabolic with depth of compressions roughly 20% of part thickness. There are no significant thickness limitations on thermal tempering, for practical applications. Thermal tempering of thin parts (less than 1 mm) can be performed using the processes described in U.S. Pat. No. 9,296,638. Stress installed through ion exchange has limits on thermal stability related to ion diffusion at higher temperatures which decreases stress. The installed stress of the thermally tempered materials could be more robust against thermal excursions as compared to ion exchange induced stress, since there are no ions to diffuse at higher temperatures. Depending on the composition of the glass-ceramic, it is also possible to ion-exchange after thermal tempering to introduce higher surface stress, if desired.

It will be apparent to those skilled in the art that various modifications and variations may be made without departing from the spirit or scope of the claimed subject matter. Accordingly, the claimed subject matter is not to be restricted except in light of the attached claims and their equivalents.

EXAMPLES

Various embodiments will be further clarified by the following examples, which are in no way intended to limit this disclosure thereto.

Example 1: Preparation of Thermally Tempered Glass-Ceramics

Table 1 provides examples of representative compositions according to the present technology. Exemplary glass-ceramics described herein exhibit a base composition comprising, in mol % or wt. % percent on the oxide basis, of the constituents listed in Table 1.

TABLE 1

| | MACOR ® (wt. %) | AV (mol %) | AW (mol %) | AX (mol %) | AY (mol %) | AZ (mol %) | BA (mol %) | ESS (mol %) |
|---|---|---|---|---|---|---|---|---|
| $SiO_2$ | 47.2 | 75.05 | 73.20 | 71.33 | 70.66 | 73.64 | 72.26 | 59.85 |
| $Al_2O_3$ | 16.7 | 9.44 | 10.15 | 10.87 | 12.92 | 10.57 | 11.70 | 16.64 |
| $Li_2O$ | 0 | 9.05 | 9.71 | 10.38 | 9.34 | 9.12 | 9.23 | 2.00 |
| MgO | 14.5 | 0 | 0 | 0 | 0 | 0 | 0 | 4.73 |
| $K_2O$ | 9.5 | 0.93 | 1.00 | 1.08 | 1.31 | 0.94 | 1.09 | 2.16 |
| BaO | 0 | 0 | 0 | 0 | 0.59 | 0 | 0.29 | 0 |
| $B_2O_3$ | 8.5 | 2.71 | 2.90 | 3.09 | 2.24 | 2.73 | 2.49 | 14.62 |
| $TiO_2$ | 0 | 1.89 | 2.05 | 2.22 | 2.03 | 2.06 | 2.01 | 0 |
| $ZrO_2$ | 0 | 0.71 | 0.77 | 0.82 | 0.68 | 0.72 | 0.73 | 0 |
| $SnO_2$ | 0 | 0.21 | 0.21 | 0.21 | 0.22 | 0.21 | 0.21 | 0 |
| F** | 6.3 | 0 | 0 | 0 | 0 | 0 | 0 | 0 |
| Total | 102.7 | 100 | 100.1 | 99.9 | 99.9 | 100 | 100 | 100 |
| Major crystallinePhase | F fluorphlogopite | β-Spodumene | β-Spodumene | β-Spodumene | β-Spodumene | β-Spodumene | β-Spodumene | Mullite |

* Minor phases are not reported.

**In the Macor ® glass F is distributed among various cations i.e., some of the oxygen in the oxides is replaced by fluorine, and therefore the oxygen equivalent of fluorine (16/38 × amount of F) is subtracted from the samples to reach 100%.

The precursor glasses were made in a platinum crucible using a batch of raw materials listed in Table 1. Each crucible containing a formulated raw materials batch was placed in a preheated furnace and were melted at a suitable temperature for a suitable period of time. The glasses were refined to produce molten precursor glass that was then cast and annealed at suitable annealing temperature. The β-spodumene precursor glasses (AV, AW, AX, AY, AZ, and BA) were melted at 1600° C. for 16 h. After melting, the glass was poured and onto a cold steel table and annealed for 3 h at 575° C. The precursor glass ESS composition was melted at 1600° C. for 4 h. After melting the glass was poured and rolled to a thickness of 4 mm. It was then annealed for 1 h at 650° C.

Ceramming

The precursor glasses for β-spodumene and mullite materials were cerammed according to the schedule given below. After holding at the growth temperature the resulting materials were left to cool at furnace rate.

Glass-Ceramics Based on β-Spodumene Crystallization

A piece of each of the formed β-spodumene glass sample was cerammed with the following schedule:

Heating at 10° C./min from 25° C. to 750° C.

Hold 2 h at 750° C.

Heating at 10° C./min from 750° C. to 950° C.

Hold 4 h at 950° C.

Cooling at furnace rate.

Glass-Ceramics Based on Mullite Crystallization

A piece of the formed ESS glass was cerammed with the following schedule:

Heating at 10° C./min from 25° C. to 750° C.

Hold 4 h at 750° C.

Heating at 10° C./min from 750° C. to 830° C.

Hold 2 h at 830° C.

Cooling at furnace rate.

Figure 2:
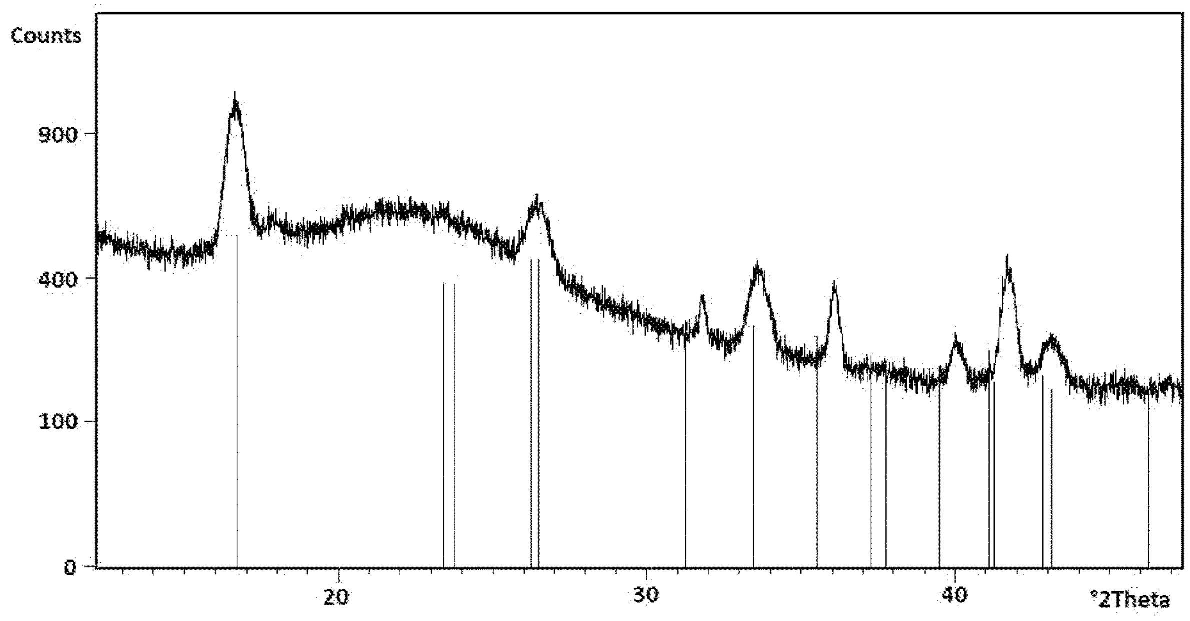
FIG. 2 represents X-ray diffraction of another exemplary glass-ceramic (ESS) of the present technology glass-ceramic, having mullite solid solution as the main or predominant crystalline phase.

After ceramming the thermal expansion of the resulting glass-ceramics was measured and X-ray diffraction (XRD) analysis was performed for one of the representative β-spodumene GC (AX) (FIGS. 1*a* and 1*b*) and one of the mullite GC (ESS) (FIG. 2). The crystallinity is estimated to be ~80-90 wt. % for β-spodumene. FIG. 1*a* shows the phase assemblage of β-spodumene solid solution, rutile, $ZrTiO_4$ and residual glass, and FIG. 1*b* provides an expanded scale to show glassy halo corresponding to the presence of residual glass. FIG. 2 shows that the main or predominant crystalline phase in ESS is mullite solid solution with general formula $Al_4B_{2-x}Si_xO_9$, and that the material contains a high level of residual glass. A small quantity of Boralsilite ($Al_{16}B_6Si_2O_{37}$) may also be present.

Example 2: Thermal Tempering of Glass-Ceramics

Exemplary glass-ceramics prepared according to the process of example 1 and commercial Macor® (Corning Incorporated, Corning, N.Y.), were thermally tempered using the process described below.

Polished plates (50×50×3 mm thick) of the β-spodumene glass-ceramics were prepared and subjected to the tempering procedure. To achieve a temper, heat must be taken out of the part quickly, cooling the surface faster than the interior. This was accomplished by heating the glass-ceramic samples near their annealing points (i.e., temperatures above and below) and soaking for 20 minutes to achieve thermal equilibrium through the part. At this time, a plate was removed from the furnace and quickly quenched into a bath of 25° C. commercially available peanut oil that was continually stirred. After approximately 3 minutes, the samples were removed from the oil and then thoroughly cleaned with dish detergent to remove the excess oil. In the case of the Mullite and Macor® glass-ceramic the same process was used except that the size of the samples was different (cylinder with a diameter of 32 mm and a thickness of 3 mm) and sunflower oil was used instead of peanut oil for tempering.

Example 3: Characterization

In the following examples, various characterizations of the materials listed in Table 1 will be described. Exemplary methods used for characterization are provided below.

Annealing point and strain point of glass-ceramics and glasses described herein can be measured by methods known to those in the art, such as, those described in ASTM C598 (and its progeny, all herein incorporated by reference) "Standard Test Method for Annealing Point and Strain Point of Glass by Beam Bending," ASTM International, Conshohocken, Pa., US.

Identity of the crystalline phases of crystal phase assemblages and/or crystal sizes of a crystalline phase were determined by X-ray diffraction (XRD) analysis techniques known to those in the art, using such commercially available equipment as the model as a PW1830 (Cu Kα radiation) diffractometer manufactured by Philips, Netherlands. Spectra were typically acquired for 2θ from 5 to 80 degrees.

Table 2 provides comparative properties of exemplary composition of the thermally tempered glass-ceramic described herein.

Ring-On-Ring Testing

Ring-on-ring testing was used to determine the effect of the tempering procedure on strength, as an increase would be expected for materials with compressive surface stress. The ring-on-ring testing was performed according to the test method described in ASTM C1499-08, Standard Test Method for Monotonic Equibiaxial Flexural Strength of Advanced Ceramics at Ambient Temperature.

Generally, the ring-on-ring test method is used to determine the biaxial strength of advanced brittle materials at ambient temperature via concentric ring configurations under monotonic uniaxial loading, and has been widely accepted as a method for evaluating the surface strength of glass articles.

The testing was done on abraded or unabraded samples. Abraded samples were prepared by abrading the outer surface of the glass article with 1 mL of 90 grit SiC particles for 5 seconds at an abrasion pressure of 5 psi. Abrading imparts a consistent flaw population in the material and reduces the impact of finishing and handling flaws on the measurements. Spodumene glass-ceramic samples were abraded but not mullite and Macor glass-ceramic samples. For example, on mullite glass-ceramics and Macor glass-ceramics experiments were performed on polished samples with diameter 32 mm and a thickness of 3 mm (ten samples for each condition), and the ring on ring test was made using a 15 mm in diameter support ring, a 5 mm in diameter loading ring, a contact radius of the ring of 1.5 mm and a head speed of 0.5 mm/min a ■ 50 mm×5 mm×3 mm thick parts for β-spodumene samples.

The average value of strength at failure for various tempered glass-ceramics from the ring-on-ring results are reported in Table 3 below.

TABLE 2

| Property | MACOR ® | AV | AW | AX | AY | AZ | BA | ESS |
|---|---|---|---|---|---|---|---|---|
| Strain point (° C.) | | | | | 815.5 | 815.9 | 815.9 | |
| Anneal point (° C.) | | | | | 869.4 | 871.9 | 871.9 | |
| Poisson's Ratio | 0.29 | 0.253 | 0.261 | 0.255 | 0.258 | 0.254 | 0.258 | 0.26 |
| Emod, GPa | 66.9 | 77.50 | 81.15 | 78.05 | 81.71 | 77.78 | 79.71 | 83 |
| Expansion at $T_q$, (ppm) | 3992 | 326 | 485 | 525 | 995 | 489 | 735 | 2060 |
| $T_q$ (° C.) | 470 | 488 | 475 | 467 | 595 | 515 | 586 | 550 |
| Expansion at $T_0$ = 700° C. (ppm) | | 1407 | 1729 | 1971 | 1528 | 1284 | 1271 | |
| Expansion at $T_0$ = 720° C. (ppm) | | | | | | | | 3700 |
| Expansion at $T_0$ = 900° C. (ppm) | | 2478 | 2800 | 3600 | 2782 | 2527 | 2478 | |
| Expansion at $T_0$ = 960° C. (ppm) | 12360 | | | | | | | |
| CTE RT-$T_q$ (ppm/° C.) | 8.8 | 0.4 | 0.7 | 0.83 | 1.31 | 0.68 | 0.92 | 3.9 |
| CTE above $T_q$ (ppm/° C.) | 17.2 | 6.7 | 5.8 | 6.6 | 6.4 | 4.9 | 6.1 | 9.6 |
| Temperature range (° C.) | 470-960 | 520-625 | 506-701 | 513-714 | 615-843 | 566-743 | 607-838 | 550-720 |

TABLE 3

| | No Quench | | 700° C. Quench | | 750° C. Quench | | 830° C. Quench | | 900° C. Quench | | 960° C. Quench | |
|---|---|---|---|---|---|---|---|---|---|---|---|---|
| Sample | MV (Mpa) | SD (Mpa) | MV (Mpa) | SD (Mpa) | MV (Mpa) | SD (Mpa) | MV (Mpa) | SD (Mpa) | MV (Mpa) | SD (Mpa) | MV (Mpa) | SD (Mpa) |
| MACOR ® | 64 | 3 | | | | | | | | | 126 | 59 |
| ESS | 118 | 77 | | | 140 | 70 | 271 | 44 | | | | |
| RAV | 57 | 2 | 66 | 9 | | | | | 91 | 8 | | |
| RAW | 85 | 4 | 75 | 4 | | | | | 104 | 3 | | |
| RAX | 70 | 9 | 99 | 11 | | | | | 144 | 22 | | |
| RAY | 70 | 9 | 65 | 7 | | | | | 106 | 8 | | |
| RAZ | 64 | 8 | 69 | 6 | | | | | 96 | 8 | | |
| RBA | 70 | 9 | 72 | 3 | | | | | 99 | 4 | | |

MV = mean value; SD = standard deviation.

Figure 3:
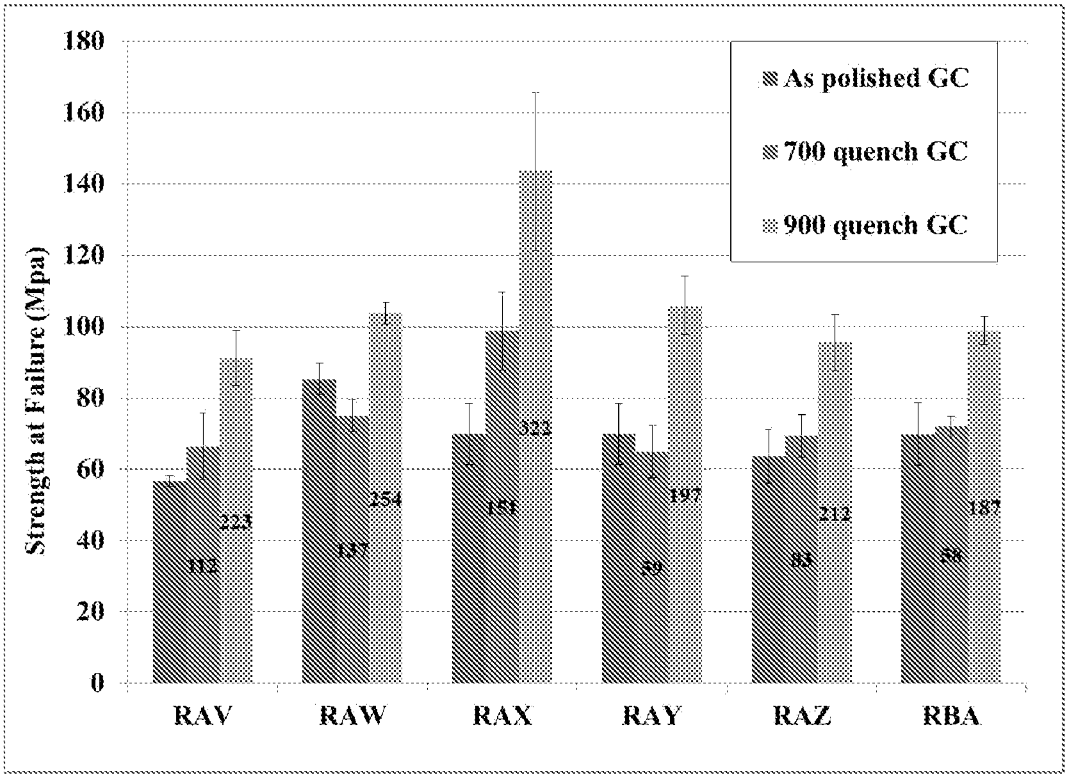
FIG. 3 is a bar graph showing strength at failure values for thermally tempered glass-ceramics of the present technology compared to non-tempered glass-ceramics, in accordance with one or more embodiments shown and described herein.
Figure 4:
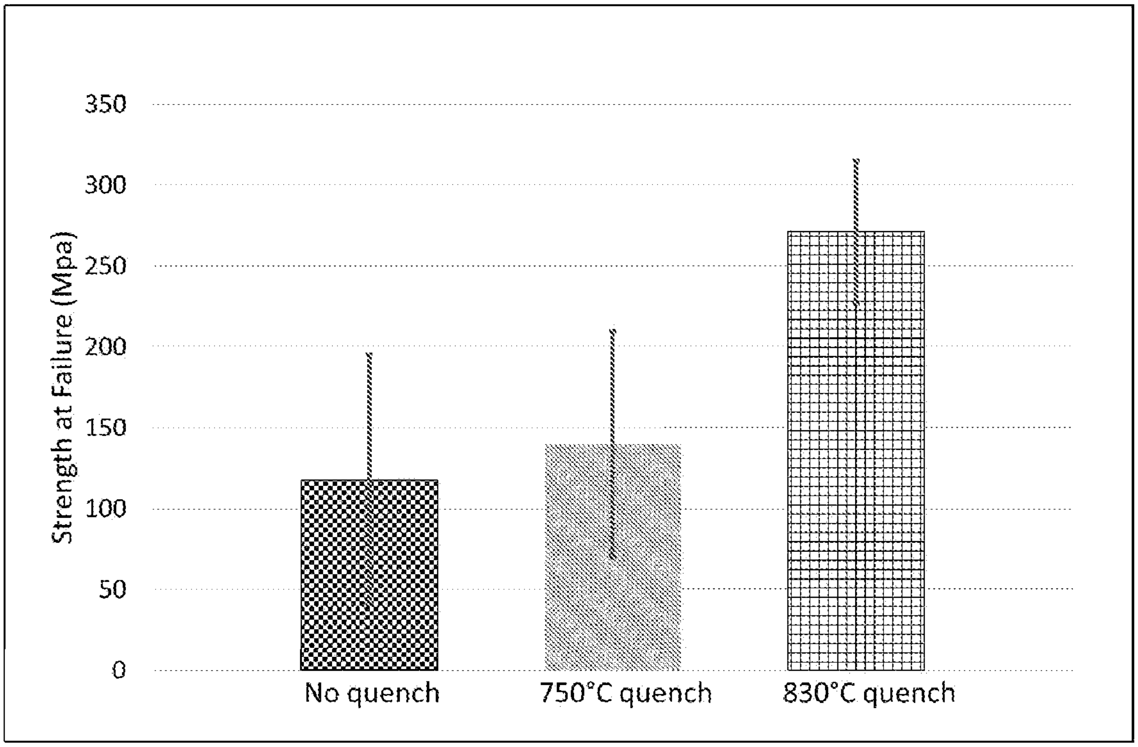
FIG. 4 represents ring-on-ring results for mullite glass ceramics, in accordance with one or more embodiments shown and described herein.
Figure 5:
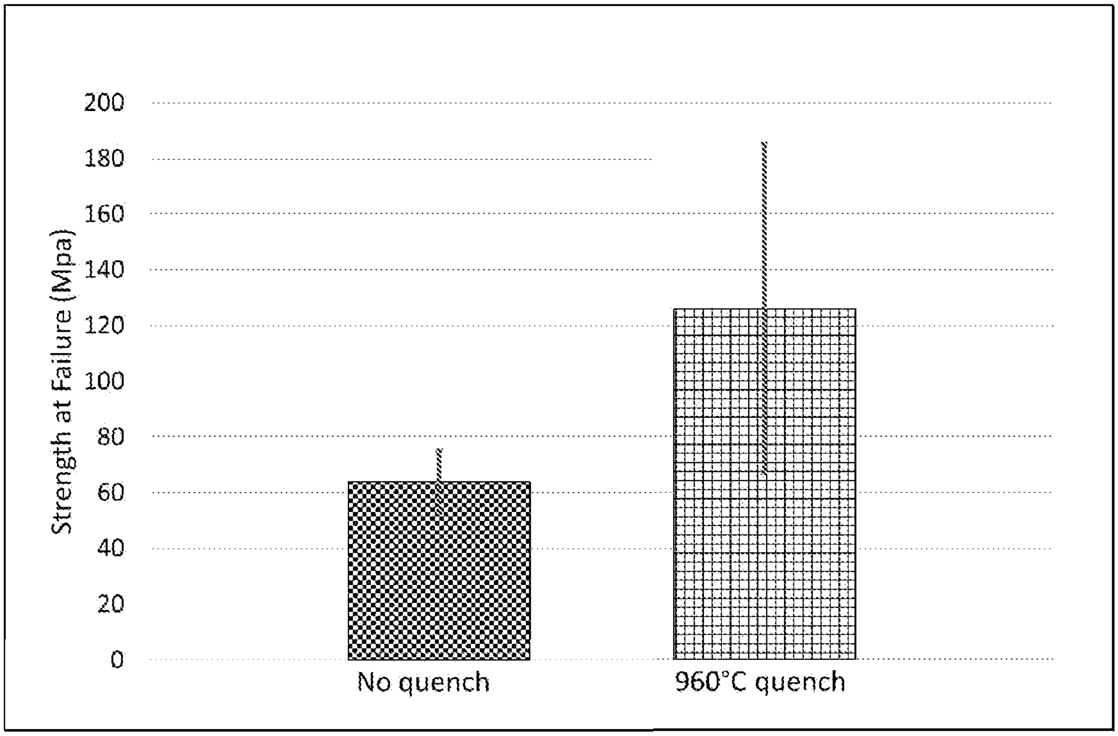
FIG. 5 represents ring-on-ring results for Macor® glass ceramics, in accordance with one or more embodiments shown and described herein.

FIG. 3 illustrates the abraded ring-on-ring results showing strength at failure values for the thermally tempered β-spodumene glass-ceramics at different quench temperatures (700° C. and 900° C.) compared to the corresponding non-tempered samples. Values in the bar graph correspond to estimated compressive stress values. Failure strengths increase with degree of tempering as estimated compressive stress increases. From the plot, it is clear that the glass-ceramics are thermally temperable. FIG. 4 illustrates the unabraded ring-on-ring results showing strength at failure values for the thermally tempered mullite glass-ceramic at different quench temperatures (750° C. and 830° C.) compared to the non-tempered sample. These results show that this glass-ceramic are thermally temperable. As expected, the standard deviations are high for unabraded samples. FIG. 5 illustrates the unabraded ring-on-ring results showing strength at failure values for the thermally tempered Macor® glass-ceramic at 960° C. quench temperature compared to non-tempered Macor®. The results show a significant increase in strength at failure when Macor® is quenched from 960° C.

Stress Profile

Since it was not possible to directly measure the stress profiles of the tempered parts, the magnitude of surface compression was estimated using the idealized formulation shown in the equation below. It is noted that the actual stress profile is expected to be parabolic where the surface compression is exactly twice that of the magnitude of the central tension. The formulation used here is likely the high end of what can be achieved.

$$\sigma=E/(1-\nu)*((\Delta L/L)_{T0})-((\Delta L/L)_{Tq})$$

Where σ=surface compression, E=E mod (GPa), ν is Poisson's ratio, and ΔL/L is determined from the CTE curve at $T_0$ and $T_q$. $T_0$ is the heating temperature for tempering and $T_q$ is taken as the point in the CTE curve where the slope changes. Below this point the thermal expansion is the thermal expansion of the glass-ceramic (i.e. a mean value between the CTE or the crystalline phase and the CTE of the residual glass. Above this point, which corresponds to the Tg of the residual glass, the increase of thermal expansion is due to the strong increase of the CTE of the residual glass.

Surface compression values from 60 to 330 MPa were estimated, depending on composition and $T_0$. The compression values are lower for the lower $T_0$ experiment, likely because the thermal gradient in the part may be smaller, delta ppm is smaller and the $T_0$ temperature is below the material strain point.

Figure 6:
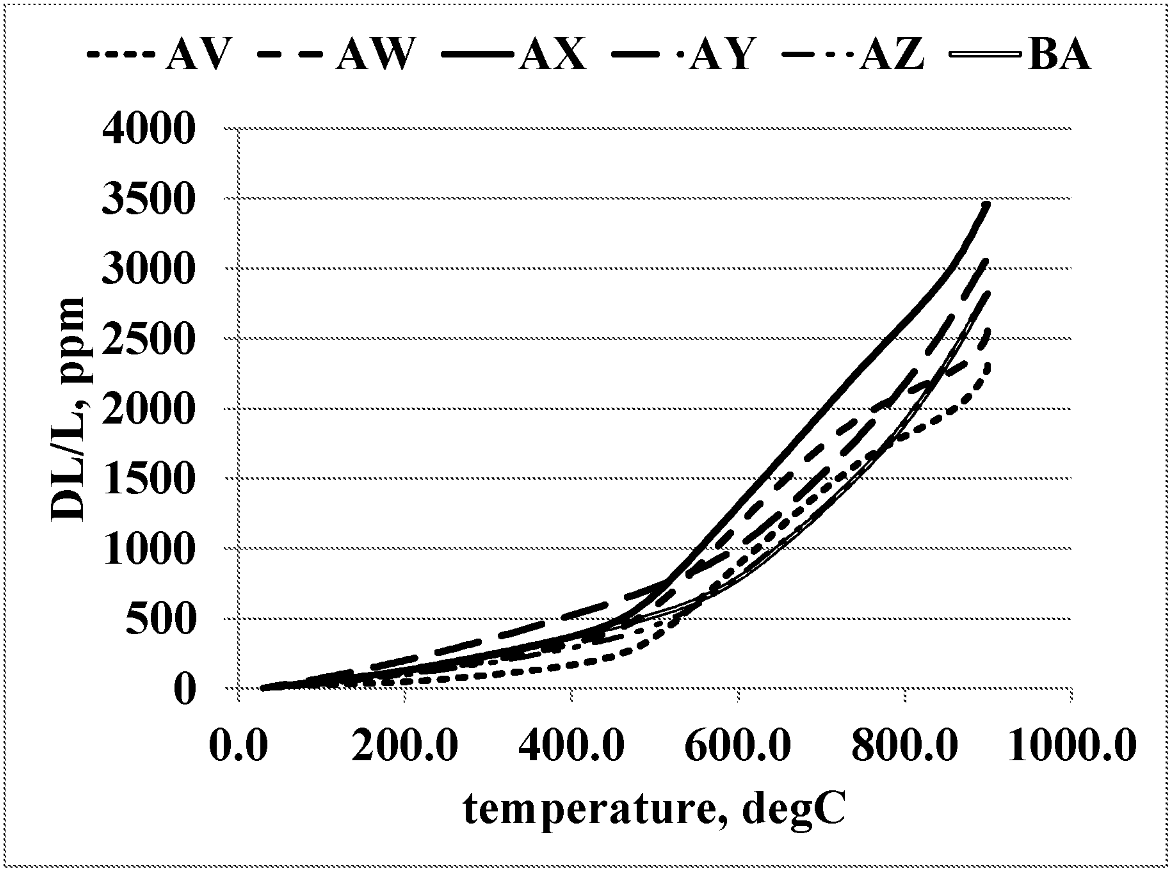
FIG. 6 represents thermal expansion curves for the glass-ceramic materials containing β-spodumene solid solution as the main or predominant crystalline phase, in accordance with one or more embodiments shown and described herein.

The origin of the tempering with respect to the thermal expansion coefficient is made clearer by inspection of the thermal expansion curves of the β-spodumene glass-ceramics, shown in FIG. 6. The cooling curves are reproduced, showing a change in slope at temperatures around 500° C. Above this point, the relatively high expansion in borosilicate glassy phase dominates and quenching from 800° C. or above results in tempering stress. In the curves, the relatively lower CTE, below 500° C. attributed to the presence of β-spodumene as the main or predominant crystalline phase, has the advantage of allowing the thermal shock resistance of the glass-ceramic to be maintained. The estimated stress using the equation above is relatively insensitive to the choice of $T_q$ below the change in slope. The estimated surface stresses are manifested in the mechanical testing results. Tempering from 700° C. results in a barely significant increase in the stress at failure, compared to the non-tempered glass-ceramics. However, tempering from 900° C. is shown to increase both the measured failure stress and estimated surface compression, compared to the 700° C. heat-treat. It is expected that the larger ΔT from 900° C. results in a larger ΔL/L. Additionally, the 900° C. heat treatment is likely more effective at installing compressive stress as it is higher than the measured anneal points for the glass-ceramics. Of the compositions that were tested, composition AX shows the largest tempering effect, likely due to the high $B_2O_3$ content in the residual glass, which is manifested in higher CTE.

Figure 7:
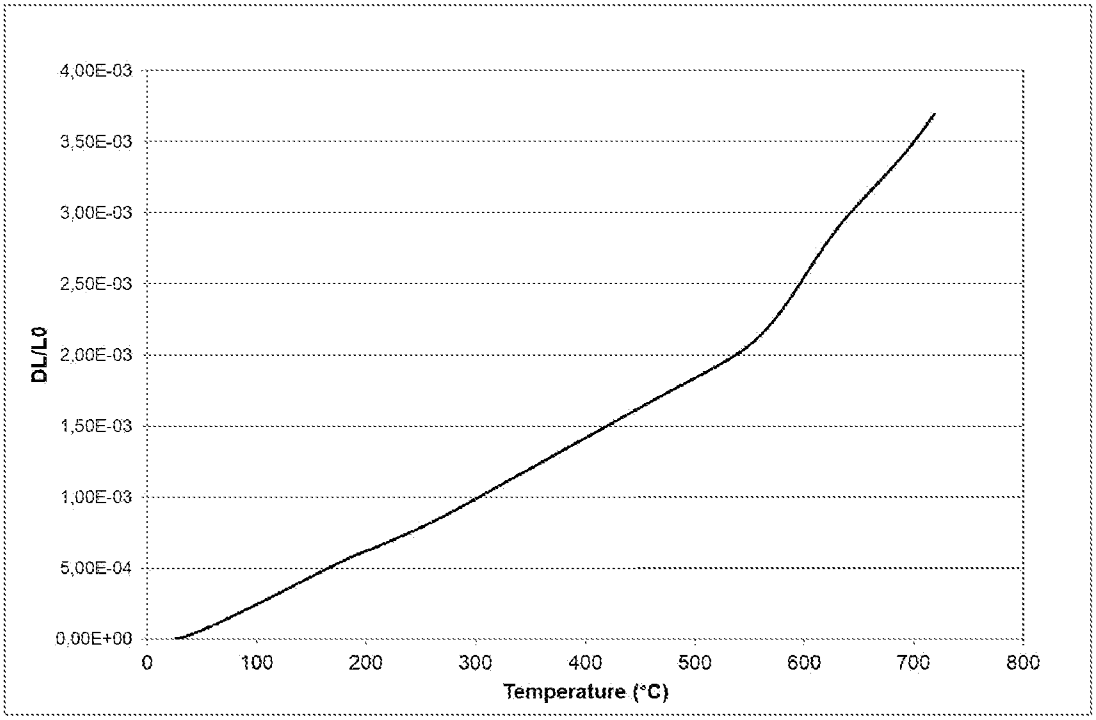
FIG. 7 represents thermal expansion curves for the glass-ceramic materials containing mullite solid solution as main or predominant crystalline phase, in accordance with one or more embodiments shown and described herein.
Figure 8:
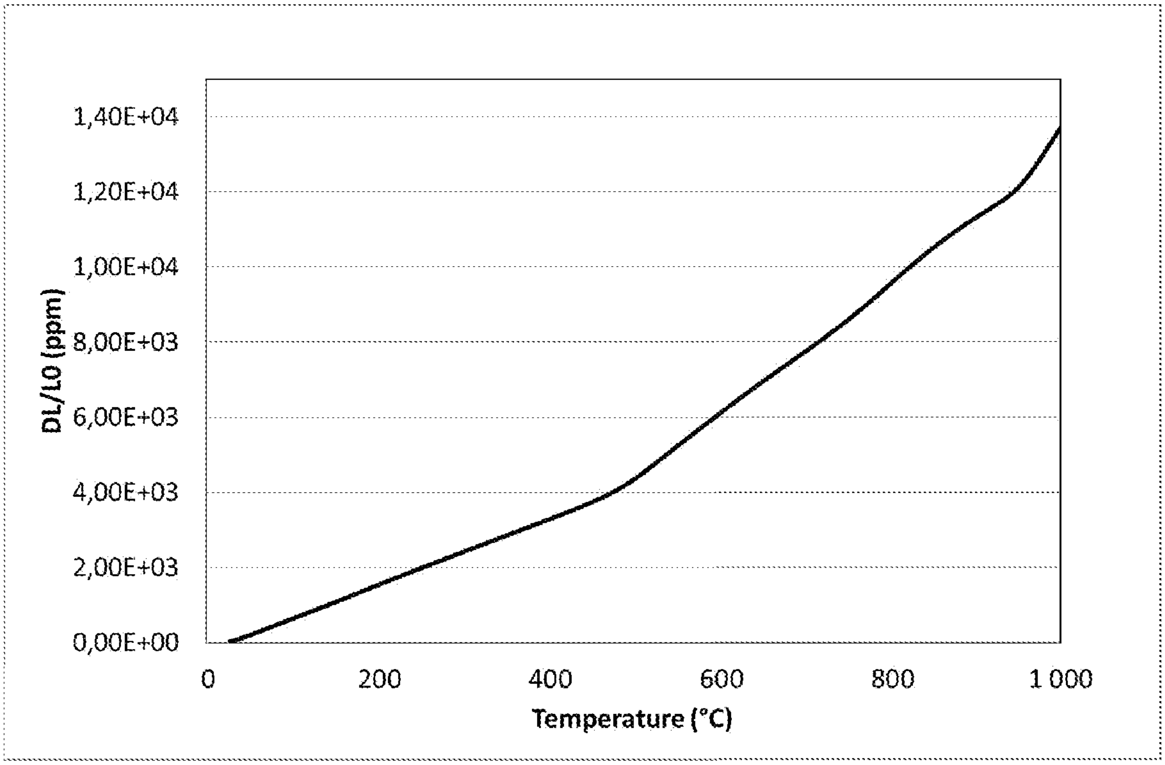
FIG. 8 represents thermal expansion curves for commercial Macor® glass ceramics, in accordance with one or more embodiments shown and described herein.

FIG. 7 shows the thermal expansion of ESS glass-ceramics containing mullite solid solution as main or predominant crystalline phase, showing a change in slope corresponding to differences in expansion related to the residual glass, at temperatures above the inflection point, and the crystalline phase, at temperatures below the inflection point. The variation of length of the glass-ceramic as a function of temperature displays the same behavior that the β-spodumene glass-ceramic described above with a change of slope around 550° C. The stress that could be brought by tempering from 720° C. has been estimated using the formula given above. This value, 187 Mpa, suggests that the thermal tempering of these glass-ceramics could lead to a significant increase of the failure stresses. In the composition ESS, $Li_2O$, $K_2O$, and part of $B_2O_3$ and MgO probably mostly remain in the residual glass and contribute to increase the thermal expansion. The presence of $Li_2O$ helps to decrease the temperature at which the change of slope is observed. FIG. 8 shows the thermal expansion of Macor® glass-ceramics containing 55% fluorphlogopite mica and 45% borosilicate glass, showing a change in slope around 470° C.

In the case of the mullite glass-ceramics, it has been demonstrated that the thermal tempering is associated to an increase of the KST (Knoop Scratch Threshold) values. For the non-tempered ESS glass-ceramic KST is in the 3 to 6 N range as compared to 5 to 7 N for the ESS glass-ceramic tempered from 830° C. KST is a measure of the load required to generate median and/or radial cracks using a Knoop diamond indenter. Below this load mostly microductile damage is observed.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

All disclosed ranges are to be understood to encompass and provide support for claims that recite any and all subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth). Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like, include the number recited and refer to ranges which may be subsequently broken down into subranges as discussed above. Finally, as will be understood by one skilled in the art, a range includes each individual member. Thus, for example, a group having 1-3 layers refers to groups having 1, 2, or 3 layers. Similarly, a group having 1-5 layers refers to groups having 1, 2, 3, 4, or 5 layers, and so forth.

The drawings shall be interpreted as illustrating one or more embodiments that are drawn to scale and/or one or more embodiments that are not drawn to scale. This means the drawings may be interpreted, for example, as showing: (a) everything drawn to scale, (b) nothing drawn to scale, or (c) one or more features drawn to scale and one or more features not drawn to scale. Accordingly, the drawings can serve to provide support to recite the sizes, proportions, and/or other dimensions of any of the illustrated features either alone or relative to each other. Furthermore, all such sizes, proportions, and/or other dimensions are to be understood as being variable from 0-100% in either direction and thus provide support for claims that recite such values or any and all ranges or subranges that may be formed by such values.

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "technology," etc., are not meant to invoke exception (b) or otherwise restrict the scope of the recited claim terms. Other than situations where exception (b) applies, nothing contained in this document should be considered a disclaimer or disavowal of claim scope.

Unless otherwise defined, all terms (including technical and scientific terms) used herein have the same meaning as commonly understood by one of ordinary skill in the art to which this technology belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. While not explicitly defined below, such terms should be interpreted according to their common meaning.

In addition, where features or aspects of the disclosure are described in terms of Markush groups, those skilled in the art will recognize that the disclosure is also thereby described in terms of any individual member or subgroup of members of the Markush group.

Unless the context indicates otherwise, it is specifically intended that the various features of the technology described herein may be used in any combination. Moreover, the disclosure also contemplates that in certain embodiments, any feature or combination of features set forth herein may be excluded or omitted. To illustrate, if the specification states that a complex comprises components A, B and C, it is specifically intended that any of A, B or C, or a combination thereof, may be omitted and disclaimed singularly or in any combination.

Unless explicitly indicated otherwise, all specified embodiments, features, and terms intend to include both the recited embodiment, feature, or term and biological equivalents thereof.

All patents, patent applications, provisional applications, and publications referred to or cited herein are incorporated by reference in their entirety, including all figures and tables, to the extent they are not inconsistent with the explicit teachings of this specification.

What is claimed is:

1. A thermally tempered aluminosilicate glass-ceramic composition comprising a crystalline phase and a residual glass phase, wherein:

the residual glass constitutes about 35% to about 55% of the total weight of the glass-ceramic;

the two phases form a system wherein the thermal expansion curve of the system has two distinct sections diverging from an inflection point temperature in the range of about 450° C. to about 600° C.; and the difference between coefficient of thermal expansion of the glass-ceramic below and above the inflection point is greater than about 4 ppm/° C.

2. The thermally tempered aluminosilicate glass-ceramic composition of claim 1, wherein the difference between coefficient of thermal expansion of the glass-ceramic above and below the inflection point is in the range of about 4 ppm/° C. to about 10 ppm/° C.

3. The thermally tempered aluminosilicate glass-ceramic composition of claim 1, wherein the coefficient of thermal expansion of the glass-ceramic below the inflection point ranges from 1 ppm/° C. to 10 ppm/° C.

4. The thermally tempered aluminosilicate glass-ceramic composition of claim 1, wherein the coefficient of thermal expansion of the glass-ceramic above the inflection point ranges from 6 ppm/° C. to 20 ppm/° C.

5. The thermally tempered aluminosilicate glass-ceramic composition of claim 1 having a Young's modulus of 70 GPa to 110 GPa.

6. The thermally tempered aluminosilicate glass-ceramic composition of claim 1, wherein the crystalline phase of the composition comprises a predominant phase selected from the group consisting of mullite, fluorophlogopite and beta-spodumene solid solutions.

7. The thermally tempered aluminosilicate glass-ceramic composition of claim 1, wherein the precursor glass of the glass-ceramic composition comprises: $SiO_2$; $Al_2O_3$; $B_2O_3$; $K_2O$; and at least one of: MgO; $Ki_2O$; $ZrO_2$; $Na_2O$, F.

8. The thermally tempered aluminosilicate glass-ceramic composition of claim 7, wherein the precursor glass of the glass-ceramic composition comprises, expressed in terms of mole percent on the oxide basis, from about 65% to about 75% $SiO_2$;
from about 8% to about 13% $Al_2O_3$;
from about 3% to about 13% $Li_2O$;
from about 0.02% to about 5% $B_2O_3$;
from about 0.5% to about 2% $K_2O$;
from about 0% to about 2% BaO; and
from about 2% to about 6% $RO_2$, wherein $RO_2$ consists of about 1% to about 4% $TiO_2$, about 0% to about 2% $ZrO_2$ and about 0% to about 1% $SnO_2$.

9. The thermally tempered aluminosilicate glass-ceramic composition of claim 7, wherein the precursor glass of the glass-ceramic composition comprises, expressed in terms of mole percent on the oxide basis, from about 55% to about 65% $SiO_2$;
from about 13% to about 19% $Al_2O_3$;
from about 0% to about 4% $Li_2O$;
from about 12% to about 17% $B_2O_3$;
from about 1% to about 4% $K_2O$; and
from about 2% to about 8% MgO.

10. The thermally tempered aluminosilicate glass-ceramic composition of claim 7, wherein the precursor glass of the glass-ceramic composition comprises, expressed in terms of weight percent on the oxide basis, from about 40% to about 55% $SiO_2$,
from about 12% to about 20% $Al_2O_3$;
from about 10% to about 18% MgO;
from about 4% to about 8% F;
from about 5% to about 10% $B_2O_3$;
from about 0% to about 2% BaO;
from about 0% to about 2% $ZrO_2$; and
from about 0% to about 16% $R_2O$, wherein $R_2O$ consists of about 5% to about 13% $K_2O$, about 0% to about 2% $Li_2O$, and about 0% to about 2% $Na_2O$.

11. An article comprising the thermally tempered aluminosilicate glass-ceramic composition of claim 1.

12. The article of claim 11, comprising a surface and having a compressive stress at the surface of the glass-ceramic of greater than about 60 MPa.

13. The article of claim 12, having a compressive stress at the surface of the glass-ceramic of from about 60 MPa to about 330 MPa.

14. The article of claim 11, which comprises an electronic device, an automotive device, an architectural device, or an appliance device.

* * * * *